(12) United States Patent
Limberg et al.

(10) Patent No.: US 8,851,201 B2
(45) Date of Patent: Oct. 7, 2014

(54) PRECISION TORQUE TOOL

(75) Inventors: Kurt Limberg, Milwaukee, WI (US);
Roger D. Neitzell, Palmyra, WI (US);
Terry Timmons, Milwaukee, WI (US)

(73) Assignee: Milwaukee Electric Tool Corporation,
Brookfield, WI (US)

( * ) Notice: Subject to any disclaimer, the term of this patent is extended or adjusted under 35 U.S.C. 154(b) by 675 days.

(21) Appl. No.: 13/057,684

(22) PCT Filed: Aug. 6, 2009

(86) PCT No.: PCT/US2009/052979
§ 371 (c)(1),
(2), (4) Date: Feb. 4, 2011

(87) PCT Pub. No.: WO2010/017371
PCT Pub. Date: Feb. 11, 2010

(65) Prior Publication Data
US 2011/0127059 A1    Jun. 2, 2011

Related U.S. Application Data

(60) Provisional application No. 61/086,594, filed on Aug. 6, 2008.

(51) Int. Cl.
*B23Q 5/00* (2006.01)
*F16D 7/04* (2006.01)

(52) U.S. Cl.
CPC ................................ *F16D 7/044* (2013.01)
USPC ...................................................... 173/178

(58) Field of Classification Search
USPC ..................... 173/5, 176, 178, 181, 216–217
See application file for complete search history.

(56) References Cited

U.S. PATENT DOCUMENTS

| | | |
|---|---|---|
| 2,662,434 A | 12/1953 | Burkhardt |
| 2,764,272 A | 9/1956 | Reynolds |
| 3,174,599 A | 3/1965 | Spyridakis et al. |
| 3,195,704 A | 7/1965 | Linsker |
| 3,199,644 A | 8/1965 | Clapp |
| 3,276,524 A | 10/1966 | Falter |
| 3,430,521 A | 3/1969 | Kulman |
| 3,477,521 A | 11/1969 | Kiester et al. |

(Continued)

FOREIGN PATENT DOCUMENTS

| | | |
|---|---|---|
| EP | 1714722 | 10/2006 |
| EP | 1714722 A2 | 10/2006 |

(Continued)

*Primary Examiner* — Robert Long
(74) *Attorney, Agent, or Firm* — Michael Best & Friedrich LLP

(57) ABSTRACT

A power tool includes a housing, a motor supported in the housing, a transmission operably coupled to the motor, an output shaft rotatable about a central axis, a clutch mechanism including a resilient member, and a clutch mechanism adjustment assembly having a first ring rotatable about the central axis. The first ring includes a cam surface spaced from the central axis in a radial direction. The clutch mechanism adjustment assembly also includes a second ring coaxial with the first cam ring and in facing relationship with the cam surface, and a cam member disposed between the cam surface and the second ring. In response to rotation of the first ring relative to the second ring, the cam member engages the cam surface to displace the first ring relative to the second ring and compress the resilient member to increase the amount of torque transferred to the output shaft.

20 Claims, 27 Drawing Sheets

(56) References Cited

U.S. PATENT DOCUMENTS

| | | | | |
|---|---|---|---|---|
| 3,739,659 A | | 6/1973 | Workman, Jr. | |
| 3,744,350 A | | 7/1973 | Raff | |
| 3,955,662 A | | 5/1976 | Thackston | |
| 3,960,035 A | | 6/1976 | Workman, Jr. et al. | |
| 3,970,151 A | | 7/1976 | Workman, Jr. | |
| 3,970,155 A | | 7/1976 | Otto | |
| 4,006,784 A | | 2/1977 | Dudek | |
| 4,043,222 A | | 8/1977 | Dudek | |
| 4,147,219 A | | 4/1979 | Wallace | |
| 4,215,594 A | | 8/1980 | Workman, Jr. et al. | |
| 4,265,320 A | | 5/1981 | Tanaka et al. | |
| 4,265,347 A | | 5/1981 | Dischler | |
| 4,281,538 A | | 8/1981 | Dudek | |
| 4,328,871 A | | 5/1982 | Gluskin | |
| 4,404,799 A | | 9/1983 | Dudek | |
| 4,418,765 A | | 12/1983 | Mori et al. | |
| 4,502,549 A | | 3/1985 | Hornung et al. | |
| 4,513,644 A | | 4/1985 | Weyer | |
| 4,516,445 A | | 5/1985 | Wlodarski | |
| 4,535,850 A | | 8/1985 | Alexander | |
| 4,782,726 A | * | 11/1988 | Ryder et al. | 81/57.4 |
| 4,823,885 A | | 4/1989 | Okumura | |
| 4,834,192 A | | 5/1989 | Hansson | |
| 4,838,361 A | | 6/1989 | O'Toole | |
| 4,838,364 A | | 6/1989 | Hansson | |
| 4,869,131 A | | 9/1989 | Ohmori | |
| 4,881,435 A | | 11/1989 | Hansson | |
| 4,892,013 A | * | 1/1990 | Satoh | 475/266 |
| 4,923,047 A | | 5/1990 | Fink et al. | |
| 4,942,794 A | | 7/1990 | Snyder et al. | |
| 4,979,408 A | | 12/1990 | Hayashi | |
| 5,004,054 A | | 4/1991 | Sheen | |
| 5,011,341 A | | 4/1991 | DeGroff | |
| 5,019,023 A | | 5/1991 | Kurosawa | |
| 5,174,255 A | | 12/1992 | Collins et al. | |
| 5,236,053 A | | 8/1993 | Butsch | |
| 5,277,527 A | | 1/1994 | Yokota et al. | |
| 5,328,306 A | | 7/1994 | Rehm et al. | |
| 5,439,086 A | * | 8/1995 | Withey et al. | 192/69.1 |
| 5,573,074 A | | 11/1996 | Thames et al. | |
| 5,595,251 A | | 1/1997 | Cook, Jr. | |
| 5,704,433 A | * | 1/1998 | Bourner et al. | 173/48 |
| 5,706,902 A | | 1/1998 | Eisenhardt | |
| 5,730,232 A | | 3/1998 | Mixer | |
| 5,738,177 A | * | 4/1998 | Schell et al. | 173/178 |
| 5,954,144 A | | 9/1999 | Thames | |
| 6,045,303 A | * | 4/2000 | Chung | 408/124 |
| 6,062,114 A | | 5/2000 | Rahm | |
| 6,076,438 A | | 6/2000 | Rahm | |
| 6,102,632 A | | 8/2000 | Potter et al. | |
| 6,142,242 A | | 11/2000 | Okumura et al. | |
| 6,142,243 A | * | 11/2000 | Mayer | 173/176 |
| 6,192,996 B1 | | 2/2001 | Sakaguchi et al. | |
| 6,206,784 B1 | | 3/2001 | Kato | |
| 6,254,572 B1 | * | 7/2001 | Knipfer et al. | 604/151 |
| 6,296,427 B1 | | 10/2001 | Potter et al. | |
| RE37,905 E | * | 11/2002 | Bourner et al. | 173/48 |
| 6,523,658 B2 | | 2/2003 | Furuta et al. | |
| 6,607,041 B2 | | 8/2003 | Suzuki et al. | |
| 6,662,882 B2 | | 12/2003 | Hansson | |
| 6,676,557 B2 | | 1/2004 | Milbourne et al. | |
| 6,745,883 B2 | | 6/2004 | Eto et al. | |
| 6,857,983 B2 | | 2/2005 | Milbourne et al. | |
| 6,887,176 B2 | | 5/2005 | Sasaki | |
| 6,892,827 B2 | | 5/2005 | Toyama et al. | |
| 6,945,337 B2 | | 9/2005 | Kawai et al. | |
| 6,983,810 B2 | | 1/2006 | Hara et al. | |
| 6,984,188 B2 | | 1/2006 | Potter et al. | |
| 7,036,605 B2 | | 5/2006 | Suzuki et al. | |
| 7,062,979 B2 | | 6/2006 | Day et al. | |
| 7,066,691 B2 | | 6/2006 | Doyle et al. | |
| 7,090,030 B2 | | 8/2006 | Miller | |
| 7,101,300 B2 | | 9/2006 | Milbourne et al. | |
| 7,121,361 B2 | | 10/2006 | Hara et al. | |
| 7,124,839 B2 | | 10/2006 | Furuta et al. | |
| 7,131,503 B2 | | 11/2006 | Furuta et al. | |
| 7,182,006 B1 | | 2/2007 | Wu et al. | |
| 7,201,235 B2 | | 4/2007 | Umemura et al. | |
| 7,210,541 B2 | | 5/2007 | Miller | |
| 7,220,211 B2 | | 5/2007 | Potter et al. | |
| 7,223,195 B2 | | 5/2007 | Milbourne et al. | |
| 7,225,707 B2 | | 6/2007 | Knopp | |
| 7,225,884 B2 | | 6/2007 | Aeberhard | |
| 7,234,536 B2 | | 6/2007 | Scholl et al. | |
| 7,308,948 B2 | | 12/2007 | Furuta | |
| 7,314,097 B2 | | 1/2008 | Jenner et al. | |
| 7,334,509 B1 | | 2/2008 | Gao | |
| 7,334,646 B2 | | 2/2008 | Hara et al. | |
| 7,343,824 B2 | | 3/2008 | Gao | |
| 7,360,607 B2 | * | 4/2008 | Aeberhard | 173/176 |
| 7,380,612 B2 | | 6/2008 | Furuta | |
| 7,380,613 B2 | | 6/2008 | Furuta | |
| 7,395,873 B2 | | 7/2008 | Nakamura et al. | |
| 7,404,781 B2 | | 7/2008 | Milbourne et al. | |
| 7,410,007 B2 | | 8/2008 | Chung et al. | |
| 7,410,441 B2 | | 8/2008 | Milbourne et al. | |
| 7,419,013 B2 | | 9/2008 | Sainomoto et al. | |
| 7,452,304 B2 | | 11/2008 | Hagan et al. | |
| 7,455,123 B2 | | 11/2008 | Aeberhard | |
| 7,469,752 B2 | | 12/2008 | Furusawa et al. | |
| 7,469,753 B2 | | 12/2008 | Klemm et al. | |
| 8,235,137 B2 | | 8/2012 | Walker et al. | |
| 2001/0049401 A1 | | 12/2001 | Salovey et al. | |
| 2002/0192043 A1 | | 12/2002 | Lin | |
| 2005/0028997 A1 | | 2/2005 | Hagan et al. | |
| 2005/0263305 A1 | | 12/2005 | Shimizu et al. | |
| 2006/0021771 A1 | | 2/2006 | Milbourne et al. | |
| 2006/0118380 A1 | | 6/2006 | Aeberhard | |
| 2006/0124332 A1 | | 6/2006 | Greese et al. | |
| 2006/0157262 A1 | | 7/2006 | Chen | |
| 2006/0211534 A1 | | 9/2006 | Roberts et al. | |
| 2006/0213675 A1 | | 9/2006 | Whitmire | |
| 2006/0236826 A1 | | 10/2006 | Cutler et al. | |
| 2006/0237205 A1 | | 10/2006 | Sia et al. | |
| 2007/0295105 A1 | | 12/2007 | Hsieh | |
| 2008/0230245 A1 | | 9/2008 | Matsunaga | |
| 2009/0020301 A1 | | 1/2009 | Aeberhard | |
| 2009/0101376 A1 | | 4/2009 | Walker et al. | |
| 2012/0222879 A1 | | 9/2012 | Bixler et al. | |

FOREIGN PATENT DOCUMENTS

| | | |
|---|---|---|
| EP | 1724065 | 11/2006 |
| EP | 1724065 A1 | 11/2006 |
| GB | 2404891 | 2/2005 |
| JP | 6320435 | 12/1994 |
| WO | WO 2010017371 | 2/2010 |

* cited by examiner

PRECISION TORQUE TOOL

RELATED APPLICATIONS

This application claims priority to U.S. Provisional Patent Application Ser. No. 61/086,594 filed on Aug. 6, 2008, the entire contents of which is incorporated herein by reference.

BACKGROUND OF THE INVENTION

The present invention relates to a power tool, and in particular, a precision torque tool and a precision torque adaptor for a power tool.

Hand-held torque wrenches are typically used to tighten and apply torque to fasteners and the like. To operate typical hand-held torque wrenches, a user applies a force on a lever arm of the wrench to impart a torque on a fastener. Some hand-held torque wrenches include devices that measure the force, and therein the torque, applied on the fastener. Other hand-held torque wrenches include mechanisms that allow the user to apply a specific torque on the fastener.

SUMMARY OF THE INVENTION

The invention provides, in one aspect, a power tool including a housing, a motor supported in the housing, a transmission operably coupled to the motor to receive torque from the motor, an output shaft rotatable about a central axis and operably coupled to the transmission to receive torque from the transmission, and a clutch mechanism coupled to the transmission. The clutch mechanism is operable in a first mode, in which torque from the motor is transferred to the output shaft through the transmission, and a second mode, in which torque from the motor is diverted from the output shaft toward a portion of the transmission. The power tool also includes a clutch mechanism adjustment assembly having a first ring rotatable about the central axis. The first ring includes a cam surface spaced from the central axis in a radial direction. The clutch mechanism adjustment assembly also includes a second ring coaxial with the first cam ring and in facing relationship with the cam surface of the first ring, and a cam member disposed between the cam surface and the second ring. The clutch mechanism includes a resilient member. In response to rotation of the first ring relative to the second ring, the cam member engages the cam surface to displace the first ring relative to the second ring along the central axis and compress the resilient member to increase the amount of torque transferred to the output shaft during the first mode of operation of the clutch mechanism.

The invention provides, in another aspect, a power tool including a housing, a motor supported in the housing, a multi-stage transmission operably coupled to the motor to receive torque from the motor, an output shaft rotatable about a central axis and operably coupled to the transmission to receive torque from the transmission, a clutch mechanism coupled to the transmission and operable in a first mode, in which torque from the motor is transferred to the output shaft through the transmission, and operable in a second mode, in which torque from the motor is diverted from the output shaft, a shift mechanism coupled to the transmission and operable to disable at least one stage of the multi-stage transmission, and a mode selector ring coupled to the shift mechanism to actuate the shift mechanism in (response to rotation of the mode selector ring. The clutch mechanism includes a resilient member. In response to rotation of the mode selector ring, the resilient member is compressible to increase the amount of torque transferred to the output shaft during the first mode of operation of the clutch mechanism.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
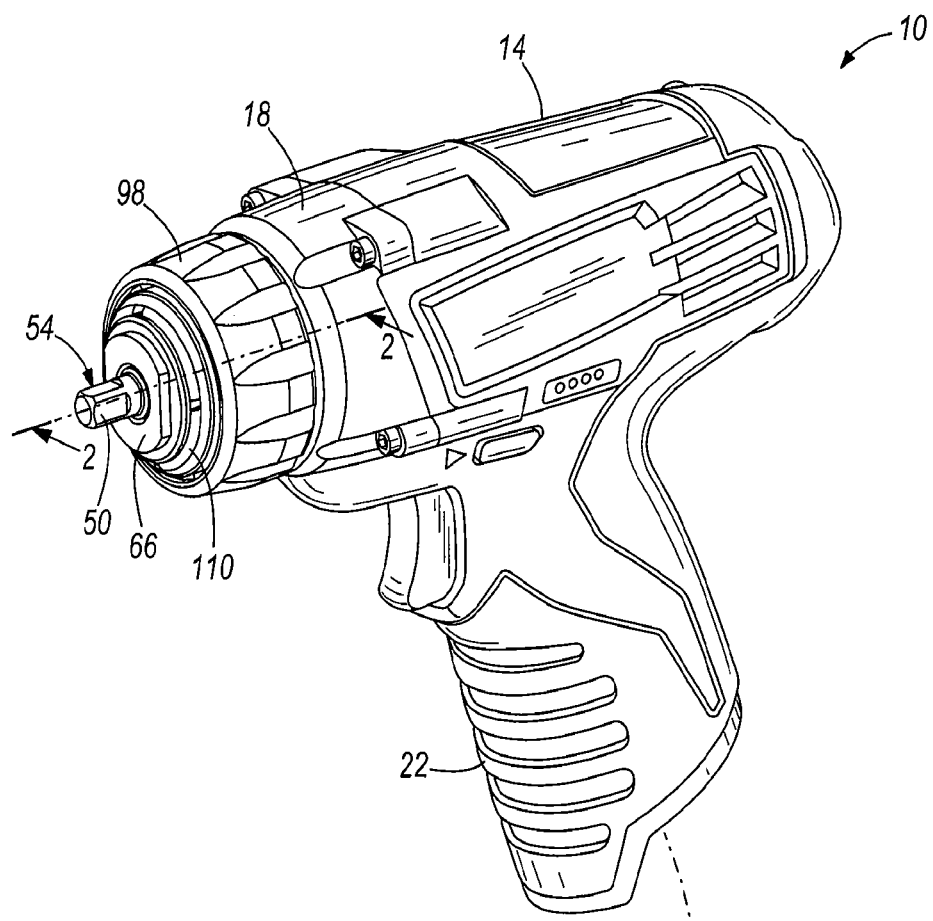
FIG. 1 is a perspective view of a precision torque tool according to one construction of the invention.
Figure 1:
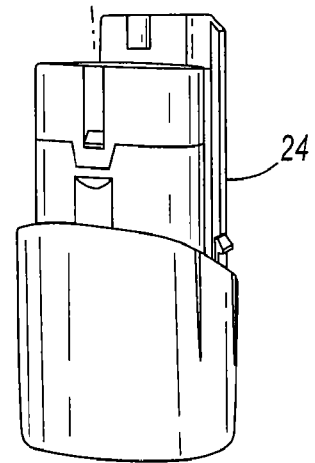

FIG. 1 illustrates a precision torque tool 10 according to one construction of the invention. The torque tool 10 applies a precise amount of torque on objects without over-tightening (i.e., over-torquing) the object, although in other constructions, the torque tool 10 may apply a torque on any object that needs to be tightened. The torque tool 10 is a power tool powered by a battery pack 24. In other constructions, the torque tool 10 is powered using a power cord connected to an electrical source (e.g., wall outlet).

In some constructions, the torque tool 10 applies a precise or set torque for applications related to plumbing. For example, a user (e.g., a plumber) operates the torque tool 10 and applies a torque on a clamping band to tighten the clamping band on a no-hub pipe coupling. In other constructions, the torque tool 10 applies a torque on fasteners and/or other components that threadably mate with one another. In the illustrated construction, the torque tool 10 is a hand-held torque tool operated by a user. In other constructions, the torque tool 10 may be modified for use on an assembly line and may be operated by a user or a robot (e.g., an automated machine).

The torque applied by the torque tool 10 is adjustable. Depending on the application, the user may adjust the torque settings of the torque tool 10, and thereby apply various and precise amounts of torque. In the illustrated construction, a user selects between a first, low torque setting and a second, high torque setting. In a further construction, it is envisioned that the torque tool 10 may be adapted to apply variable torque. That is, the torque tool 10 may apply any level of torque between the first and second torque setting.

With continued reference to FIG. 1, the torque tool 10 includes a housing 14 including a handle 22 and a casting 18 coupled to the housing 14. The handle 22 is shaped to allow a user to easily grasp and operate the torque tool 10 via a trigger switch (not shown for ease of illustration). In some constructions, the handle 22 is an ergonomic handle allowing a user to comfortably hold and support the torque tool 10.

The illustrated torque tool 10 also includes the battery pack 24 electrically coupled to the motor such that the torque tool 10 is a hand-held, battery-operated power tool. In the illustrated construction, the battery pack 24 is a 12-volt power tool battery pack and includes three (3) Lithium-ion battery cells. In other constructions, the battery pack 24 may include fewer or more battery cells such that the battery pack 24 is a 14.4-volt power tool battery pack, an 18-volt power tool battery pack, or the like. Additionally or alternatively, the battery cells may have chemistries other than lithium-ion such as, for example, nickel cadmium, nickel metal-hydride, or the like. In still other constructions, the torque tool 10 may be a corded power tool.

The battery pack 24, or other power supply, connects to the handle 22 of the housing 14 and selectively provides power (e.g., electricity) to the motor to drive a drive mechanism of the torque tool 10. In the illustrated construction, the battery pack 24 is partially insertable into the handle 22 of the housing 14 to electrically couple to the motor, but may alternatively be coupled to the handle 22 by, for example, sliding, snapping, rotating, or the like.

Figure 2:
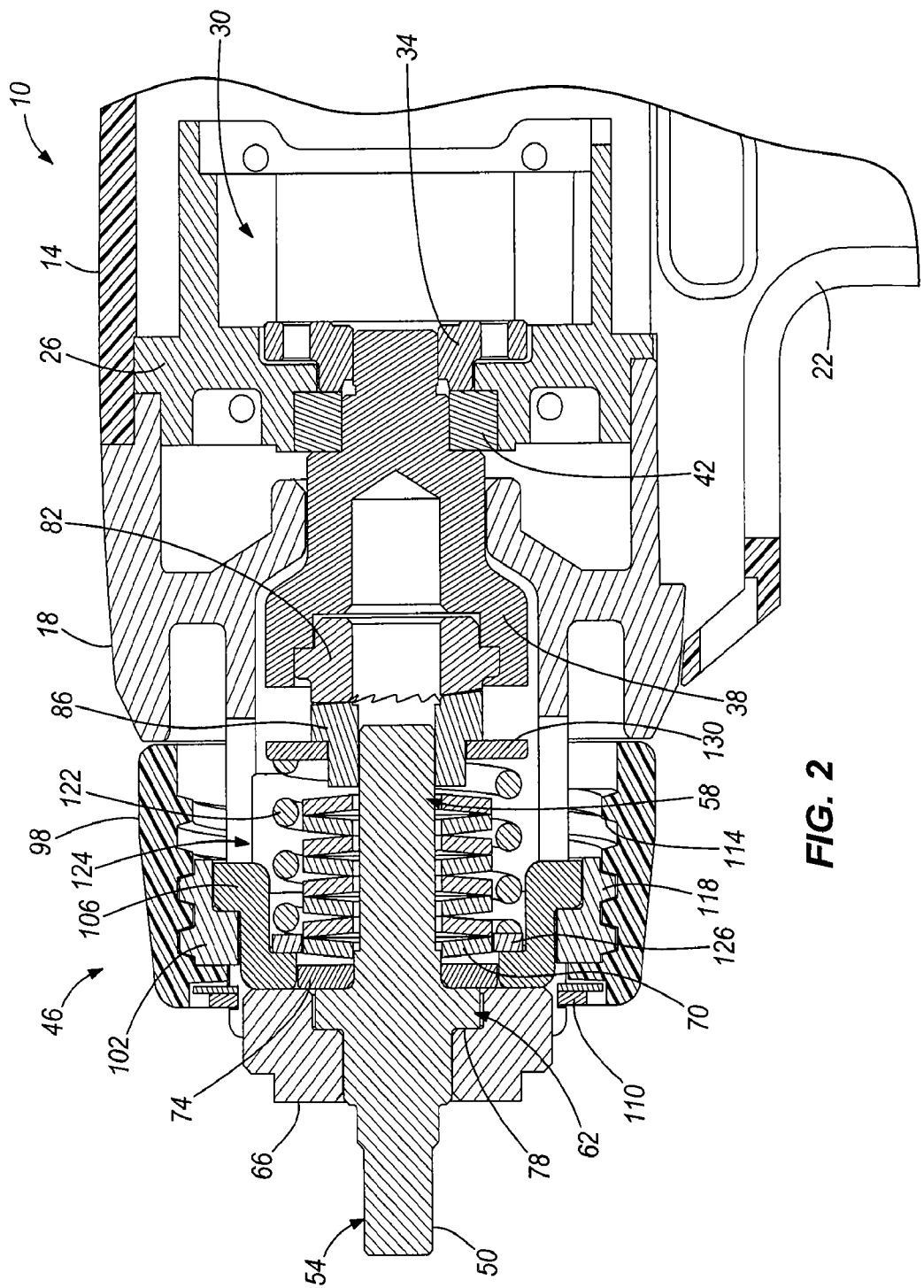
FIG. 2 is a cross-sectional view of the precision torque tool of FIG. 1 taken along line 2-2, and illustrating a torque mechanism in a low torque setting.
Figure 3:
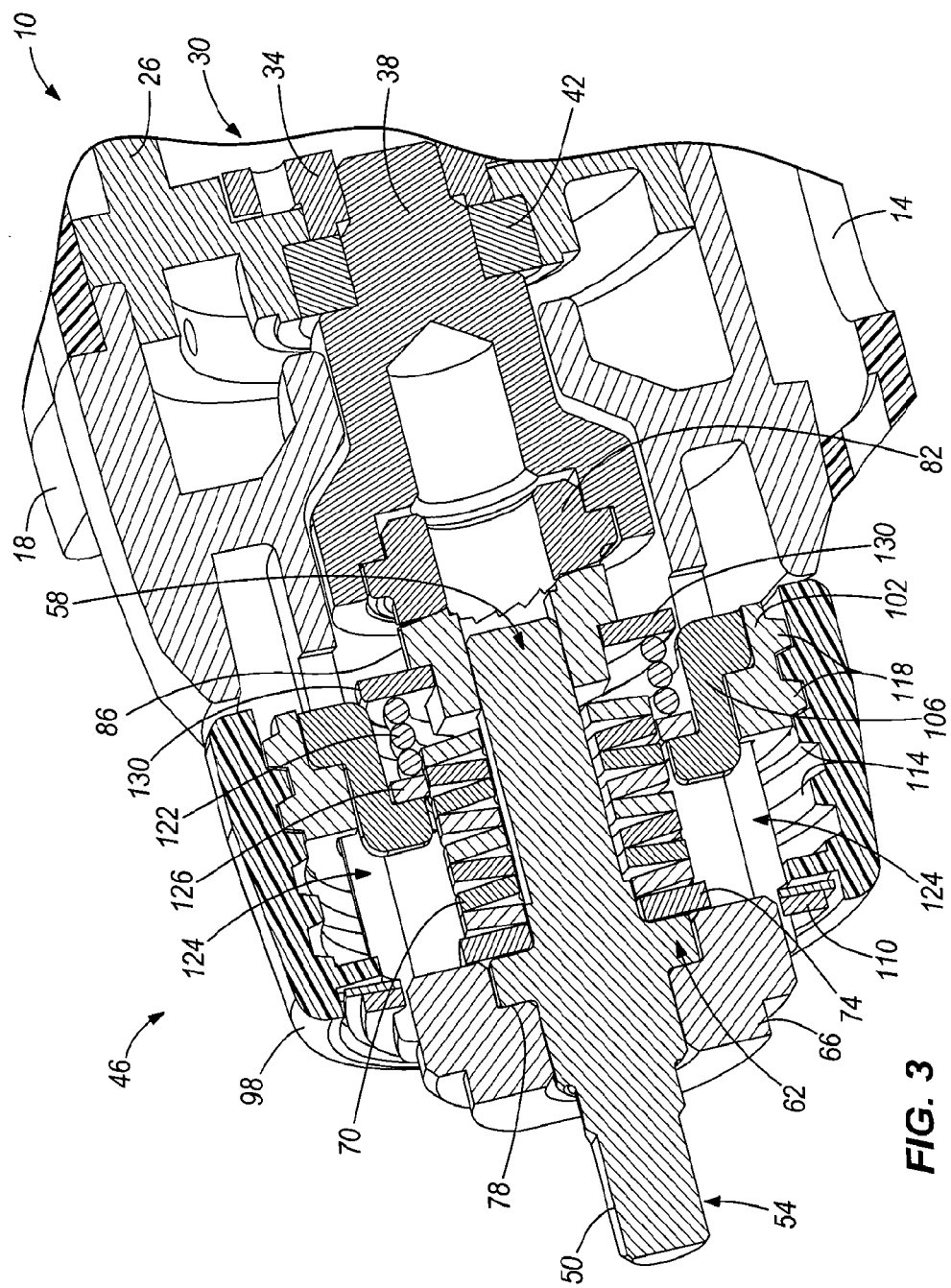
FIG. 3 is a cross-sectional view of the precision torque tool illustrating the torque mechanism in a high torque setting.
Figure 4A:
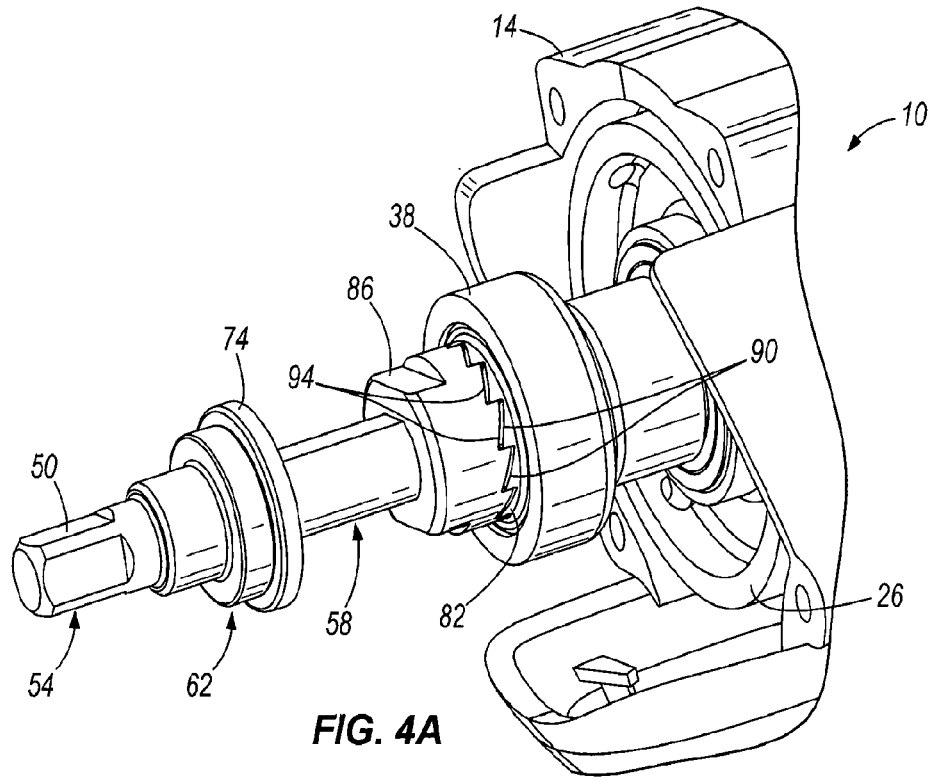
FIGS. 4A and 4B are perspective views of a first clutch cam and a second clutch cam of the torque mechanism.
Figure 4B:
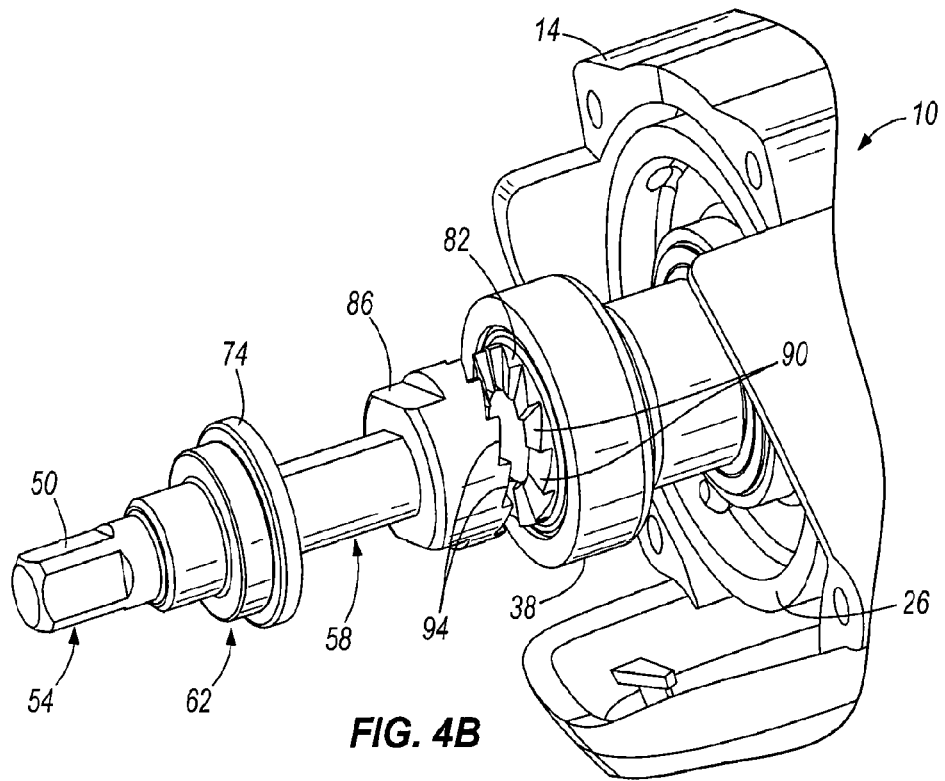

With reference to FIGS. 2 and 3, a gear casing 26 is positioned within the housing 14 and coupled to the casting 18, whereby a gear set 30 is positioned in the gear casing 26. In the illustrated construction, the gear set 30 includes an output carrier 34 that rotates with respect to the gear casing 26 and planetary gears (not shown) that communicate rotational motion from a motor of the torque tool 10 to the output carrier 34. The output carrier 34 is a second stage output carrier of the gear set 30 and is driven or rotated by the motor of the torque tool 10 via the planetary gears. In further constructions, other known gear sets or mechanisms may be used.

A drive shaft 38 is coupled to the output carrier 34 and rotates in response to rotation of the output carrier 34. In the illustrated construction, a drive shaft bearing 42 is positioned between the drive shaft 38 and the gear casing 26 to support the drive shaft 38 and permit the drive shaft 38 to rotate substantially friction-free with respect to the gear casing 26. In other constructions, additional drive shaft bearings may be positioned between the drive shaft 38 and, for example, the casting 18.

The illustrated torque tool 10 includes a torque mechanism 46 and an output shaft 50 rotated by the torque mechanism 46. The torque mechanism 46 operates between the first, low torque setting (FIG. 2) and the second, high torque setting (FIG. 3). During the low torque setting, the torque mechanism 46 transmits a precise, low torque to the output shaft 50. During the high torque setting, the torque mechanism 46 transmits a precise, high torque to the output shaft 50. In another construction, the torque mechanism 46 operates at variable torque settings transmitting respective precise torques that are between the low torque and the high torque. The output shaft 50 extends from the casting 18. The output shaft 50 includes a first end 54, a second end 58, and a hub 62 positioned between the first and second ends 58. The illustrated output shaft 50 is formed as a single part, although in other constructions, the output shaft 50 is formed of multiple parts coupled to one another.

With reference to FIG. 1, the first end 54 of the output shaft 50 is shaped to either directly or indirectly transmit torque. To directly transmit torque, the first end 54 is coupled to, for example, a fastener (e.g., a screw with a square head). The first end 54 of the output shaft 50 transmits torque by directly engaging and rotating the fastener. In other constructions, the first end 54 indirectly transmits torque by coupling the first end 54 to, for example, a drill bit, a rotary tool, a socket or other transition part. As an example, the rotary tool couples to the first end 54 of the output shaft 50 and rotates therewith. Typically, the rotary tool includes a first portion shaped to mate with the first end 54 of the output shaft 50 and a second portion having a shape and/or size different than that of the first end 54 in order to transmit torque to components of various shapes and sizes. In other constructions, the first end 54 is formed as the drill bit, rotary tool, socket, etc.

With respect to FIGS. 2 and 3, the torque mechanism 46 includes an adjustment bushing 66 threadably coupled to the casting 18, a first spring 70, and a spring plate 74 positioned between the adjustment bushing 66 and the first spring 70. The illustrated first spring 70 is a disc spring (e.g., a Belleville disc spring), although in other constructions, any compression spring may be used. The first spring 70 is positioned around the output shaft 50. The first end 54 of the output shaft 50 extends axially through the adjustment bushing 66, and the hub 62 of the output shaft 50 is recessed into a channel 78 of the adjustment bushing 66. The adjustment bushing 66 maintains axial alignment of the output shaft 50 within the casting 18 and allows the output shaft 50 to freely rotate within the adjustment bushing 66. In other constructions, a bearing is positioned between the output shaft 50 and the adjustment bushing 66 to allow the output shaft 50 to rotate substantially friction-free within the adjustment bushing 66.

With reference to FIGS. 2-4B, the torque mechanism further includes a first clutch cam 82 and a second clutch cam 86. The illustrated adjustment bushing 66 applies a force on the output shaft 50 via the hub 62, which is transmitted to the second clutch cam 86. The first spring 70 is compressed between the spring plate 74 and the second clutch cam 86, and thereby generates a first compressive force against the second clutch cam 86. Accordingly, the combination of the two forces applied on the second clutch cam 86 by the adjustment bushing 66 and the first spring 70 provides an engaging force between the first clutch cam 82 and the second clutch cam 86 of the torque mechanism 46 (FIGS. 2-4B). The engaging force maintains engagement of the first and second clutch cams 82, 86 to transmit the low torque from the first clutch cam 82 to the second clutch cam 86.

The first clutch cam 82 is coupled to and rotates with the drive shaft 38 such that the first clutch cam 82 rotates at the same speed as the drive shaft 38. In other constructions, the first clutch cam 82 is integrated with the output shaft 50 as a single part. The illustrated first clutch cam 82 includes first cam surfaces 90 (FIGS. 4A and 4B) having positive angles. The first cam surfaces 90 are positioned radially about a rotational axis of the torque mechanism 46.

The second clutch cam 86 is coupled to and rotates with the output shaft 50. In other constructions, the second clutch cam 86 is integrated with the drive shaft 38 as a single part. The second clutch cam 86 includes second cam surfaces 94 (FIGS. 4A and 4B) having positive angles. The second cam surfaces 94 are positioned radially about the rotational axis of the torque mechanism 46. The first clutch cam 82 is able to engage and thereby rotate the second clutch cam 86 via the respective cam surfaces 90, 94. Alternatively, the tooth-like cam surfaces 90, 94 on the first and second clutch cams 82, 86, respectively, may be replaced with respective friction surfaces that interface along a common plane oriented substantially normal to the output shaft 50.

The positive angle of the first and second cam surfaces 90, 94 determines, in part, the output torque of the torque tool 10.

For example, by increasing the positive angle, the amount of torque that can be transmitted through the cam surfaces 90, 94 increases. Similarly, by decreasing the positive angle, the amount of torque that can be transmitted through the cam surfaces 90, 94 decreases.

With reference to FIGS. 2 and 3, the torque mechanism 46 further includes an adjustment cap 98, a torque ring 102 and a torque link 106. The adjustment cap 98 is positioned between a plate 110 and a portion of the casting 18. Axial movement of the adjustment cap 98 is resisted by the plate 110 coupled to another portion of the casting 18. The adjustment cap 98 includes internal threads 114 and rotates with respect to the casting 18. The illustrated internal threads 114 are double lead threads, although in other constructions, other thread types may be used. The torque ring 102 includes external threads 118 (i.e., double lead threads) engaged with the internal threads 114 of the adjustment cap 98. The torque ring 102 is movable between a low torque position (FIG. 2) proximate the plate 110 and a high torque position (FIG. 3) proximate the second clutch cam 86, which is actuated by rotation of the adjustment cap 98. The internal threads 114 of the adjustment cap 98 drive the external threads 118 of the torque ring 102 toward the high torque position in response to rotational movement of the adjustment cap 98. Similarly, the torque ring 102 is moved from the high torque position to the low torque position by rotating the adjustment cap 98 in the opposite direction.

The torque link 106 is positioned between the torque ring 102 and a second spring 122. The torque ring 102 transmits axial movement from the torque ring 102 to the second spring 122. The torque link 106 follows a linear opening 124 in the casting 18 and is biased against the torque ring 102 by the second spring 122. In other constructions the torque ring 102 and the torque link 106 are formed as a single part. The second spring 122 is a compression spring and is positioned around the output shaft 50 and the first spring 70. The second spring 122 is used to set the torque tool 10 at the high torque setting.

In the high torque setting, the second spring 122 is compressed between a first plate 126 and a second plate 130, and thereby generates a second compressive force against the second clutch cam 86. The first plate 126 is coupled to the torque link 106 and the second plate 130 is positioned proximate the second clutch cam 86. The second spring 122 is positioned between the plates 126, 130, and the first plate 126 distributes uniform compression of the second spring 122. The second spring 122 is compressed and held between the first and second plates 126, 130. The second compressive force generated by the second spring 122 is transmitted through the second plate 130 to the second clutch cam 86. The second spring 122 is compressed and decompressed in response to the axial or linear movement of the torque ring 102 and the torque link 106.

The torque mechanism 46 is pre-calibrated to output the precise, low torque in the first, low torque setting and the precise, high torque in the second, high torque setting. Calibration of the torque tool is performed by a manufacturer of the torque tool, although in other constructions, various individuals or machines can pre-calibrate (or re-calibrate) the torque tool 10. In the illustrated construction, the calibrated low torque is set at 60 inch-pounds and the calibrated high torque is set at 80 inch-pounds. In other constructions, the calibrated low and high torques may be set at any amount of torque. To obtain the calibrated low torque and therein pre-calibrate the torque mechanism 46, the manufacturer adjusts the engaging force applied to the first and second clutch cams 82, 86. In the illustrated construction, the manufacturer adjusts the engaging force by rotating the adjustment bushing 66 with respect to the casting 18 which thereby increases or decreases the non-calibrated torque of the torque tool 10.

If the non-calibrated torque is less than the calibrated low torque (i.e., 60 inch-pounds), then the manufacturer increases the engaging force between the first and second clutch cams 82, 86. The engaging force is increased by rotating the adjustment bushing 66 to increase the threading with respect to the casting 18. The adjustment bushing translates axially toward the drive shaft 38 and increases the force applied on the hub 62 by increasing the pre-load on the first spring 70. The increased force on the output shaft 50 (i.e., the hub 62) is transmitted to the second clutch cam 86, which increases the engaging force between the first and second clutch cams 82, 86. In addition, the adjustment bushing 66 compresses the output shaft 50 slightly against the compressive force of the first spring 70. In some constructions, the first compressive force applied against the second clutch cam 86 is increased when the output shaft 50 is compressed slightly. Increasing the first compressive force of the first spring 70 further increases the engaging force transmitted to the first and second clutch cams 82, 86.

Similarly, if the non-calibrated torque is greater than the calibrated low torque (i.e., 60 inch-pounds), then the manufacturer decreases the amount of threading between the adjustment bushing 66 and the casting 18 by threading the adjustment bushing 66 away from the drive shaft 38. Accordingly, the adjustment bushing 66 decreases the force applied on the hub 62 of the output shaft 50 and therein decreases the engaging force between the first and second clutch cams 82, 86 by decreasing the pre-load on the first spring 70.

The tool 10 may also include structure to facilitate independent calibration of the high torque setting (i.e., 80 inch-pounds) from the calibration of the low torque setting (i.e., 60 inch-pounds). For example, the nose of the casting 18 may include a radially outwardly-extending protrusion (not shown) in facing relationship with the interior of the adjustment cap 98. A fastener (e.g., a screw) may be engaged with a threaded aperture through the protrusion oriented parallel with the shaft 50. The tip of the fastener opposite the head may be used to provide a hard stop against at least one of the torque link 106 and the torque ring 102 to limit the amount of compression exerted on the second spring 122 by the torque ring 102 and link 106. If the non-calibrated high torque setting is less than the calibrated high torque setting (i.e., 80 inch-pounds), then the manufacturer may increase the engaging force between the first and second clutch cams 82, 86 by backing the fastener out of the protrusion (i.e., moving the tip of the fastener to the right from the point of view of FIG. 2) such that the torque ring 102 and torque link 106 may further compress the second spring 122 to increase the pre-load on the spring 122 to achieve the calibrated high torque setting of the tool 10. Likewise, if the non-calibrated high torque setting is greater than the calibrated high torque setting (i.e., 80 inch-pounds), then the manufacturer may decrease the engaging force between the first and second clutch cams 82, 86 by further threading the fastener into the protrusion (i.e., moving the tip of the fastener to the left from the point of view of FIG. 2) to further limit the extent of the axial movement of the torque ring 102 and torque link 106 to reduce the amount of available compression on the second spring 122. Therefore, the amount of available pre-load on the spring 122 is reduced to achieve the calibrated high torque setting of the tool 10.

To operate the torque tool in the low torque setting (FIG. 2), the user inserts the first end 54 of the output shaft 50 into an object, for example, a fastener. As the drive shaft begins to rotate, the first clutch cam 82 coupled thereto transmits torque to the second clutch cam 86 via the first and second cam surfaces 90, 94. The output shaft 50 coupled to the second clutch cam 86 rotates and accordingly torques the fastener. Once the low torque (e.g., 60 inch-pounds) is reached, the second clutch cam 86 overcomes the engaging force between the first and second clutch cams 82, 86, thus separating the first and second cam surfaces 90, 94 of the first and second clutch cams 82, 86 respectively. The separation results in sliding or slipping between the first and second cam surfaces 90, 94. When the low torque is reached and slipping commences, the drive shaft 38 and the output shaft 50 rotate independently of one another, and the drive shaft 38 does not transmit torque to the output shaft 50 thereby preventing over-torquing of objects. Thus, when the torque tool 10 is in the low torque setting, the output shaft 50 is able to precisely apply the low torque (e.g., 60 inch-pounds) to the fastener and cannot apply torque beyond the low torque setting to the fastener due to the slipping cam surfaces 90, 94.

When the first and second clutch cams 82, 86 are disengaged and slip with respect to one another, a ratcheting sound is heard by the user. This sound results from the sliding and shifting of the first and second cam surfaces 90, 94 with respect to one another.

With reference to FIG. 3, the torque mechanism 46 is actuated to the high torque setting by rotating the adjustment cap 98 and thereby translating the torque ring 102 and the torque link 106 toward the drive shaft 38. In the illustrated construction, the adjustment cap 98 is rotated until the torque ring 102 is translated into the high torque position. The adjustment cap 98 stops rotating when the torque ring 102 reaches the high torque position to signify that the torque mechanism is set in the high torque setting. The torque link 106 compresses the second spring 122 and thereby applies the second compressive force against the second clutch cam 86. Compressing the second spring 122 increases the engaging force between the first and second clutch cams 82, 86. Hereinafter, the increased engaging force is referred to as the high torque engaging force.

To operate the torque tool in the high torque setting (FIG. 3), the user inserts the first end 54 of the output shaft 50 into a fastener. As the drive shaft 38 begins to rotate, the first clutch cam 82 coupled thereto transmits torque to the second clutch cam 86 via the first and second cam surfaces 90, 94. The output shaft 50 coupled to the second clutch cam 86 rotates and accordingly torques the fastener. Once the high torque (e.g., 80 inch-pounds) is reached, the second clutch cam 86 overcomes the high torque engaging force between the first and second clutch cams 82, 86, thus separating the first and second cam surfaces 90, 94 of the first and second clutch cams 82, 86 respectively. The separation results in sliding or slipping between the high cam surfaces 90 and 94. When the high torque is reached and slipping commences, the drive shaft 38 and the output shaft 50 rotate independently of one another. The drive shaft 38 does not transmit torque beyond the high torque to the output shaft 50, thereby preventing over-torquing of objects. Thus, when the torque tool 10 is in the high torque setting, the output shaft 50 is able to precisely apply the high torque (e.g., 80 inch-pounds) to the fastener and cannot apply any additional torque to the fastener due to the slipping cam surfaces 90, 94.

To return the torque tool to the low torque setting, the user rotates the adjustment cap 98 until the torque ring 102 is translated to the low torque position (FIG. 2). In the low torque position, the torque link 106 is positioned to allow the second spring 122 to expand to a length nominally less than its uncompressed length to maintain a small and insignificant amount of compression on the second spring 122 to hold the second spring 122 in place between the plates 126, 130.

Because the contribution of the second spring 122 in its nominally uncompressed state is insignificant, the engaging force transmitted to the second clutch cam 86 that yields the low torque is effectively entirely provided by the first spring 70.

In a further construction, the torque tool 10 is operated at variable torque settings by rotating the adjustment cap 98 to translate the torque ring 102 to particular positions between the low torque position (FIG. 2) and the high torque position (FIG. 3). The second spring 122 is compressed a different amount in each of the particular positions, which generates corresponding compression forces on the second clutch cam 86. The torque mechanism 46 thereby generates different, precise torques at each of the variable torque settings. In some constructions, the adjustment cap 98 includes identifier marks for the user to follow when rotating the adjustment cap 98 to each of the variable torque settings. The identifier marks may be provided by the manufacturer or applied after manufacture by the user.

Figure 5:
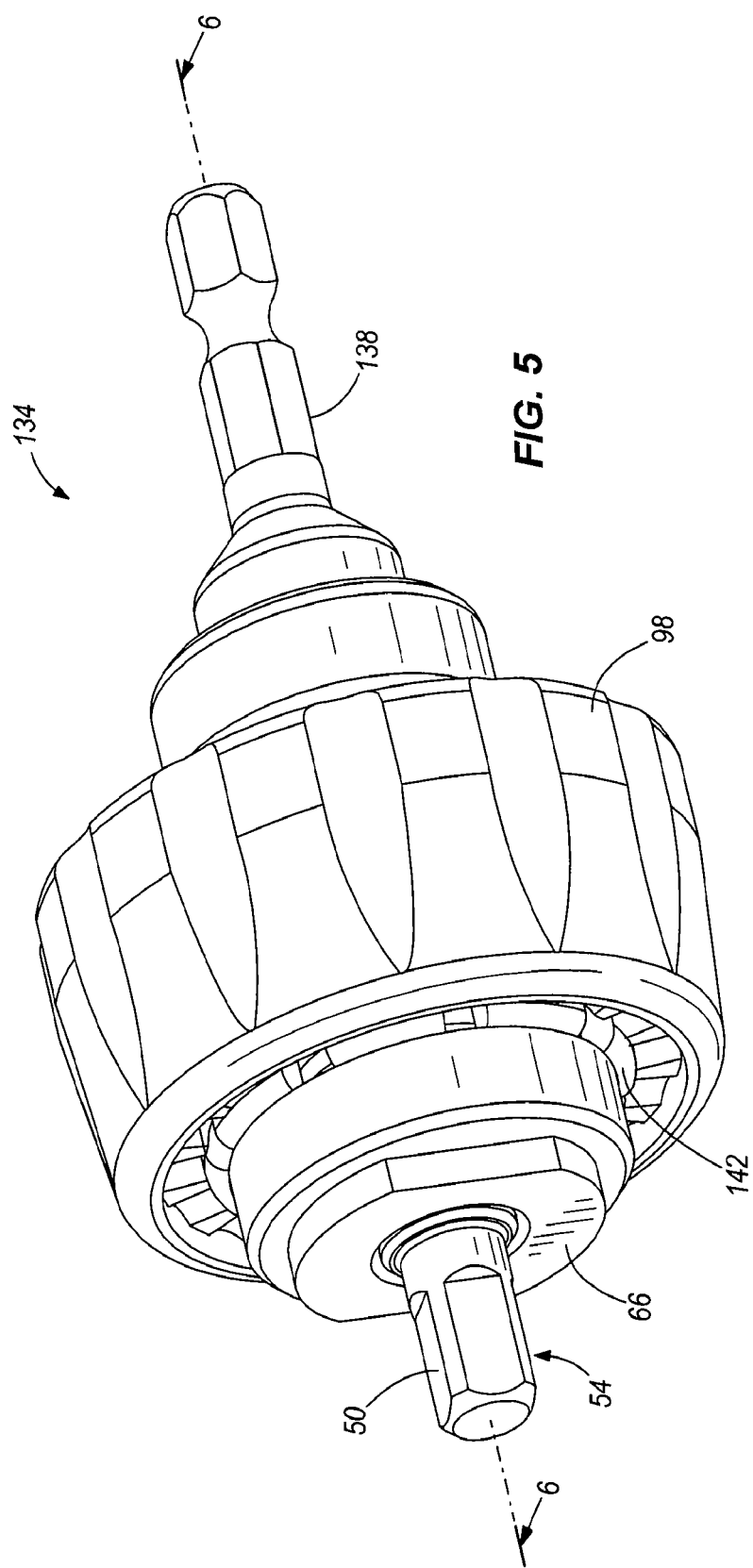
FIG. 5 is a perspective view of a torque adaptor according to another construction of the invention.
Figure 6:
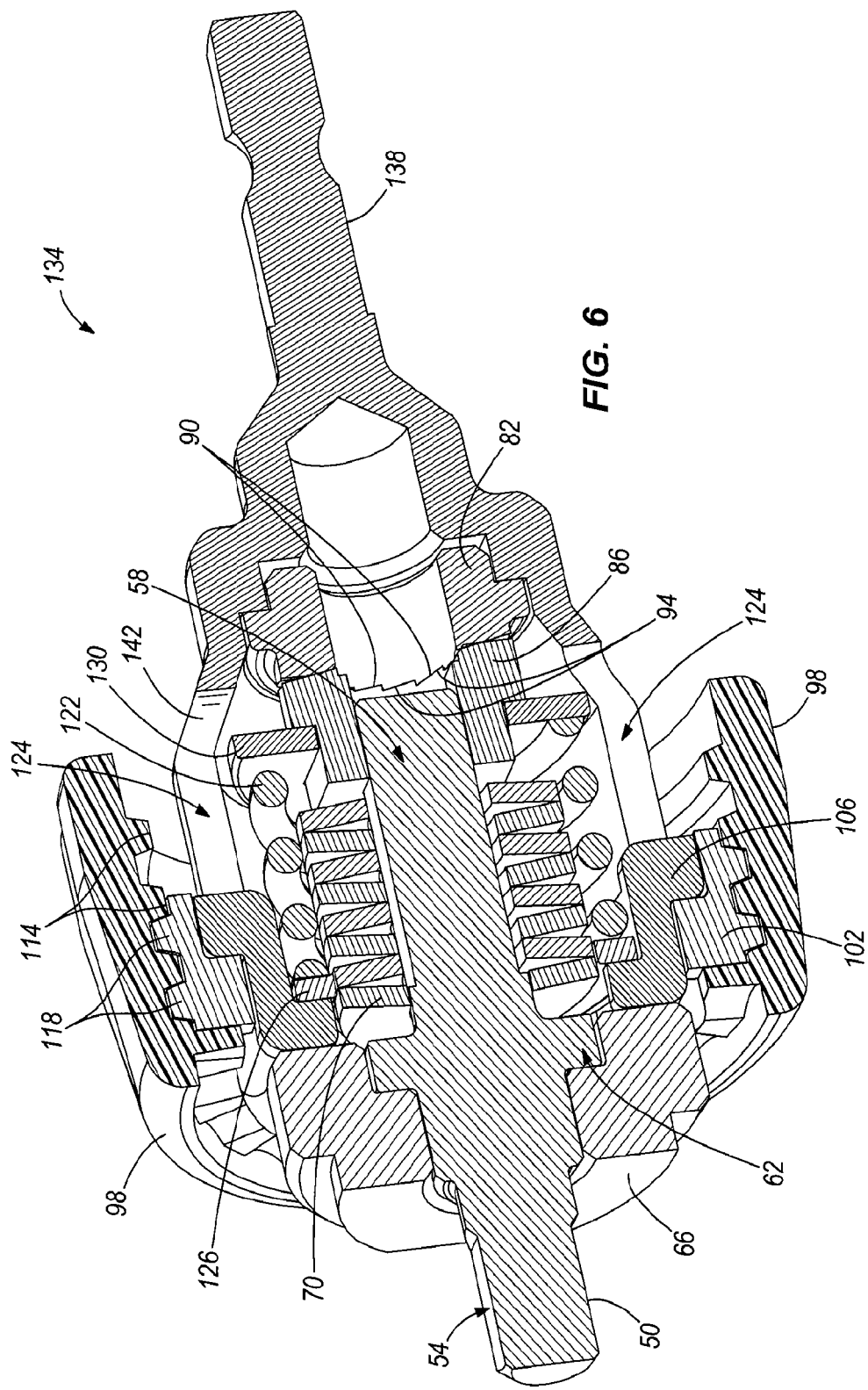
FIG. 6 is a cross-sectional view of the torque adaptor shown in FIG. 5 taken along line 6-6, and illustrating a torque mechanism in a low torque setting.
Figure 7:
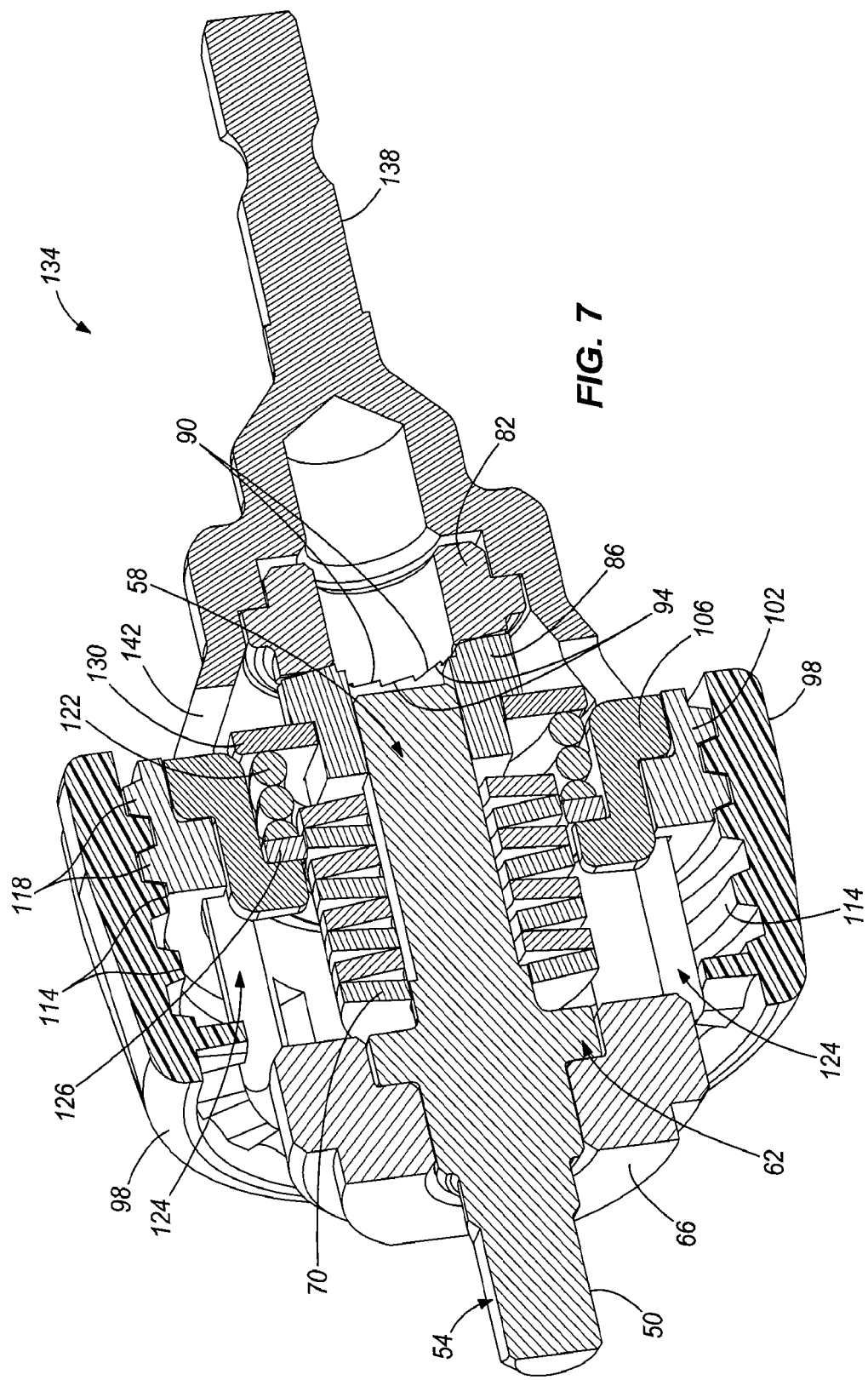
FIG. 7 is a cross-sectional view of the torque adaptor illustrating the torque mechanism in a high torque setting.
Figure 8:
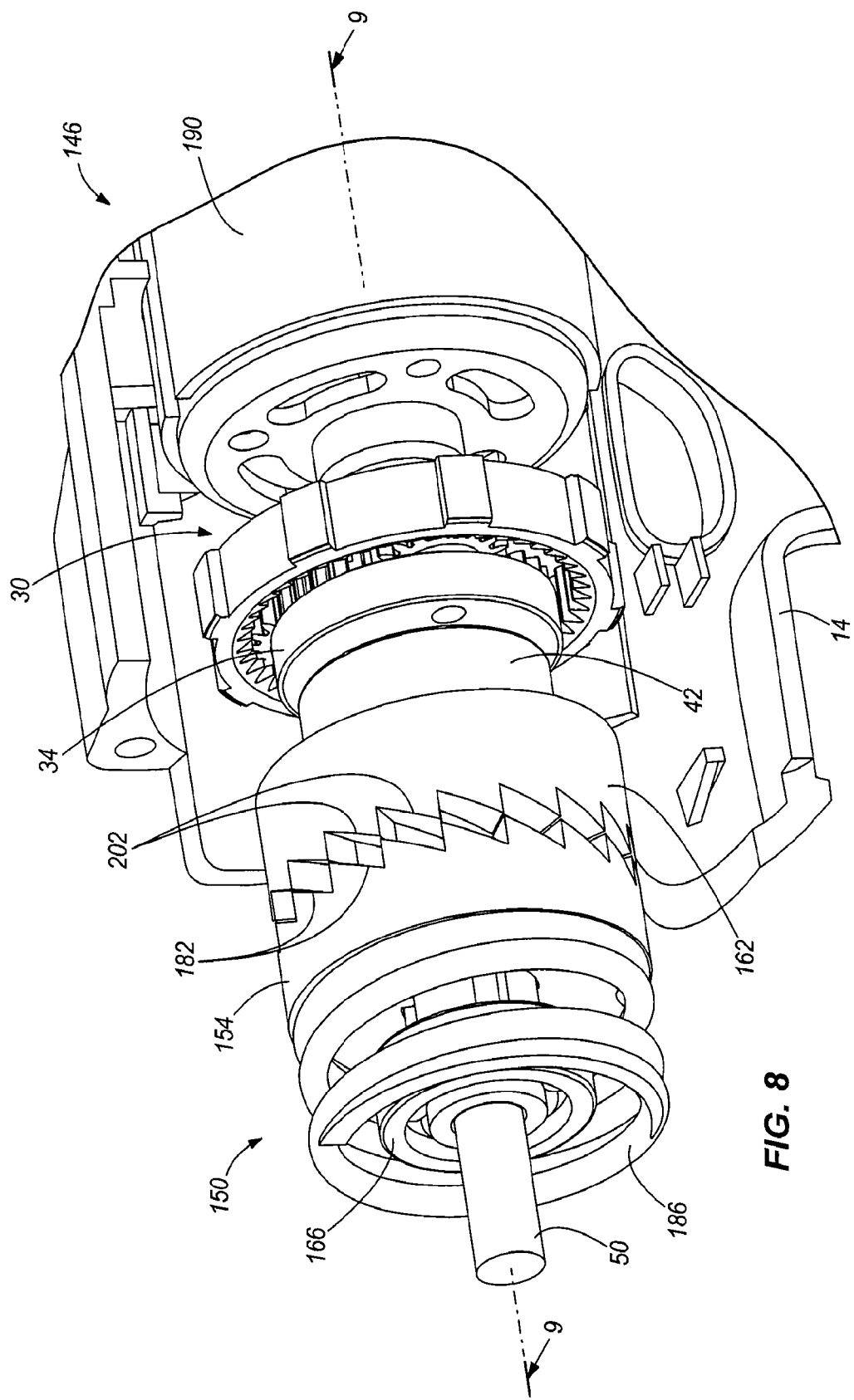
FIG. 8 is a perspective view of a precision torque tool according to another construction of the invention.

FIGS. 5-7 illustrate an adapter 134 according to another construction of the invention. The adapter 134 shown in FIGS. 5-7 is similar to the torque mechanism 46 of the torque tool 10 shown in FIGS. 1-3; therefore like structure will be identified by the same reference numerals.

The adapter 134 includes a drive shaft 138 that is insertable into and driven (rotated) by a power tool, such as a battery operated drill. With reference to FIGS. 6 and 7, the drive shaft 138 includes a body 142 that supports the first and second clutch cams 82, 86. The drive shaft body 142 is integrally formed as part of the drive shaft 138 and thereby rotates with the drive shaft 138. The adjustment bushing 66 is threaded on the drive shaft body 142. The first clutch cam 82 and the adjustment cap 98 are coupled to the drive shaft body 142 and as the drive shaft 138 rotates, the first clutch cam 82 and the adjustment cap 98 rotate therewith.

Similar to the torque mechanism 46 shown in FIGS. 2 and 3, the adapter 134 is pre-calibrated by increasing or decreasing the amount of threading between the adjustment bushing 66 and the drive shaft body 142. Adjusting the threading either increases or decreases the engaging force on the first and second clutch cams 82, 86. The adapter 134 is operable in the low torque setting or the high torque setting. In other constructions, the adapter 134 is operated in variable torque settings between the low and high torque settings. As described above with reference to FIGS. 2 and 3, the adjustment cap 98 is rotated to translate the torque ring 102 between a low torque position (FIG. 6) and a high torque position (FIG. 7).

In the low torque position, the output shaft 50 transmits the precise, low torque to objects (e.g., fasteners). Once the low torque is reached, the cam surfaces 90, 94 between the first and second clutch cams 82, 86 slip with respect to one another such that no additional torque (beyond the low torque) is applied to the output shaft 50. Similarly, in the high torque position, the output shaft 50 transmits the precise, high torque to objects. Once the high torque is reached, the cam surfaces 90, 94 slip with respect to one another such that no additional torque (beyond the high torque) is applied to the output shaft 50.

FIGS. 8-15 illustrate a torque tool 146 according to another construction of the invention. The torque tool 146 is similar to the torque tool 10 illustrated in FIGS. 1-3; therefore like structure will be identified by the same reference numerals. It should be noted that for ease of illustration, the casting 18 is shown removed from the torque tool 146 in FIGS. 8, 9, 13 and 14.

Figure 13:
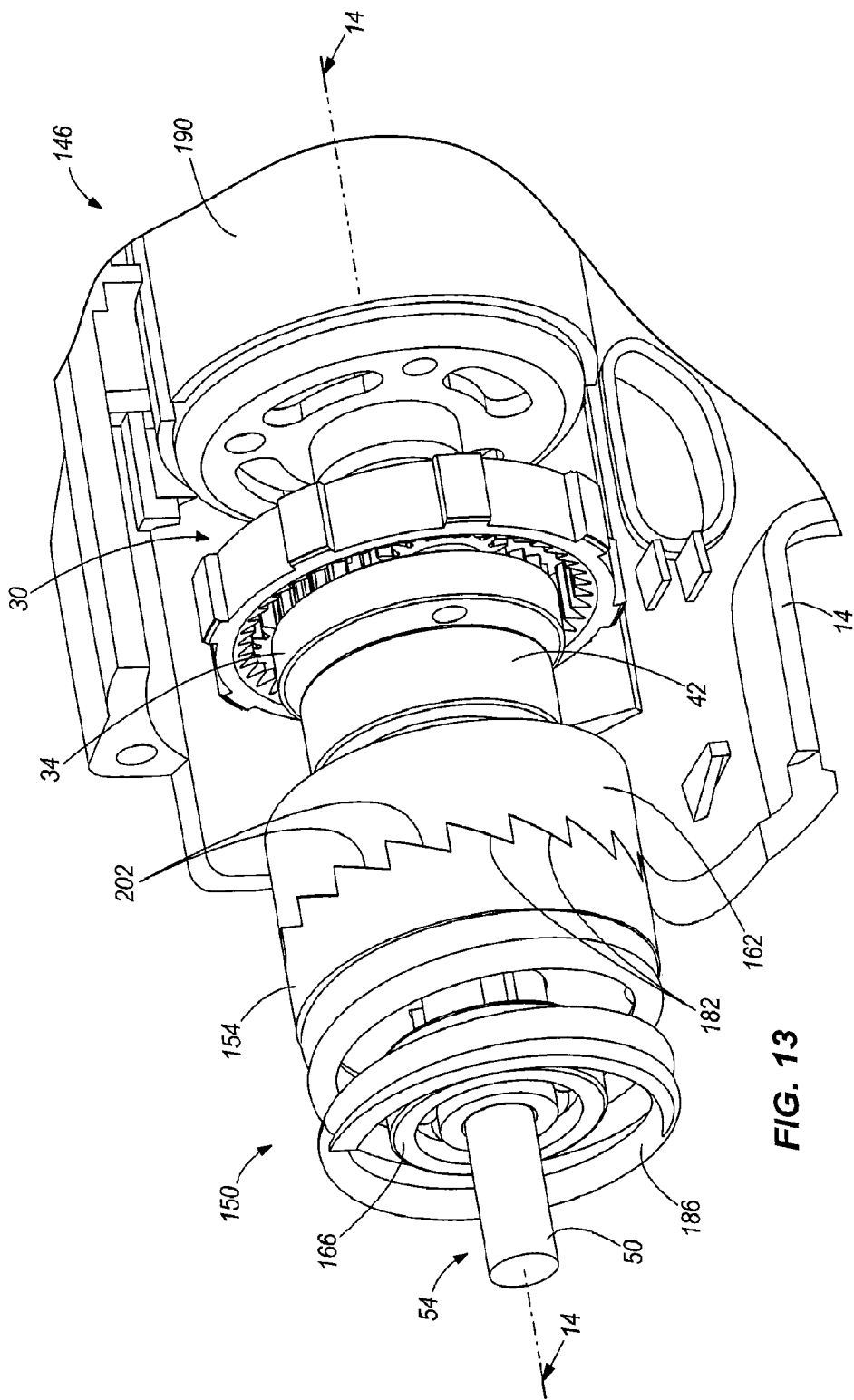
FIG. 13 is a perspective view of the precision torque tool shown in FIG. 8 illustrating the torque mechanism in a high torque setting.
Figure 14:
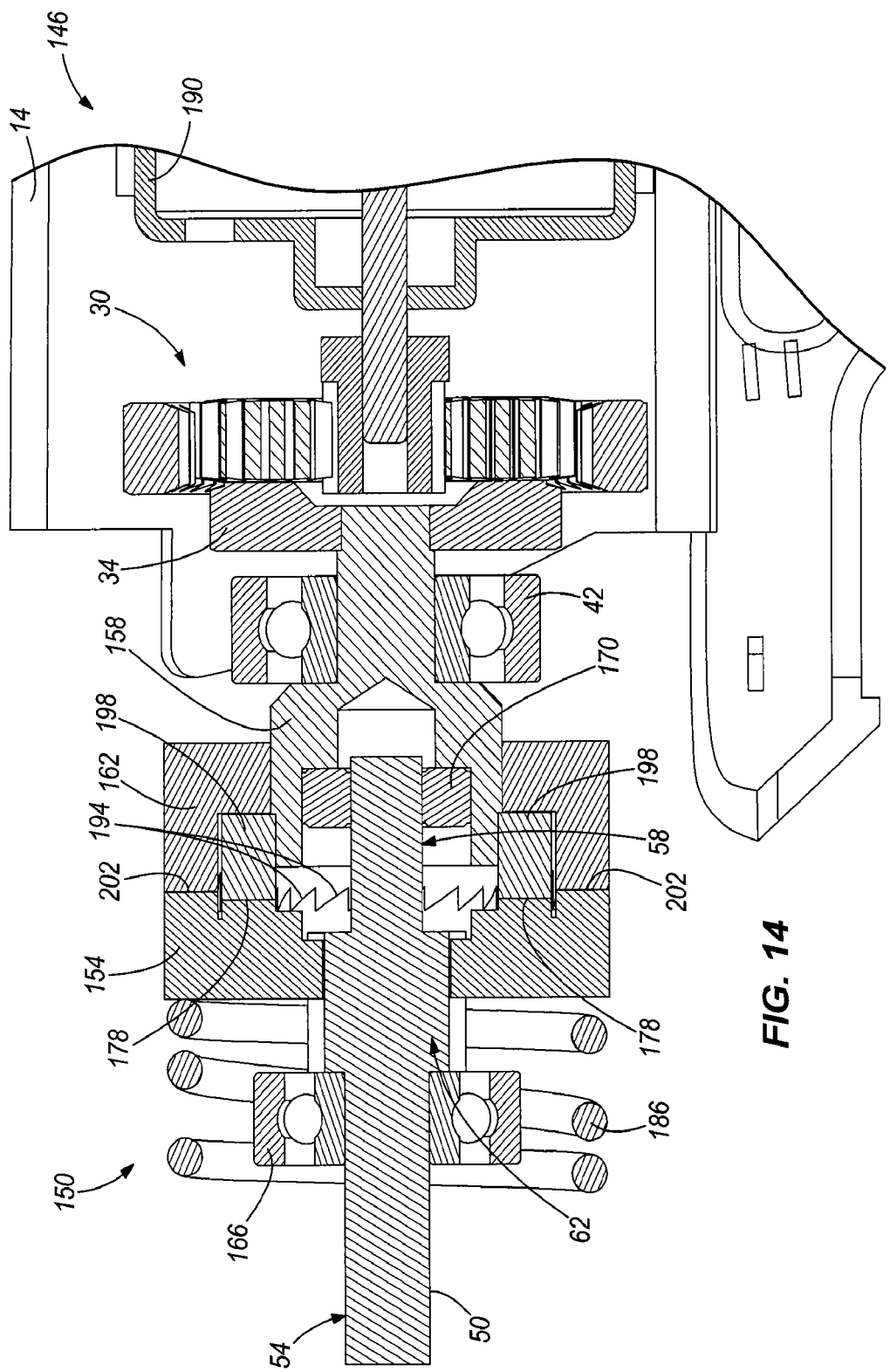
FIG. 14 is a cross-sectional view of the precision torque tool shown in FIG. 13 taken along line 14-14.

The torque tool 146 includes a torque mechanism 150 that outputs precise amounts of torque to various objects, such as fasteners. The torque mechanism 150 operates between a low torque setting (FIGS. 8 and 9) and a high torque setting (FIGS. 13 and 14). In the low torque setting, the torque mechanism 150 limits the output of the torque tool to a precise, low torque. In the illustrated construction, the low torque is 60 inch-pounds; although in other constructions, the torque mechanism 150 may be calibrated to output any amount of low torque. Similarly, in the high torque setting, the torque mechanism 150 limits the output of the torque tool to a precise, high torque, which is greater than the low torque. In the illustrated construction, the high torque is 80 inch-pounds; although in other constructions, the torque mechanism may be calibrated to output any amount of high torque that is greater than the low torque.

Figure 9:
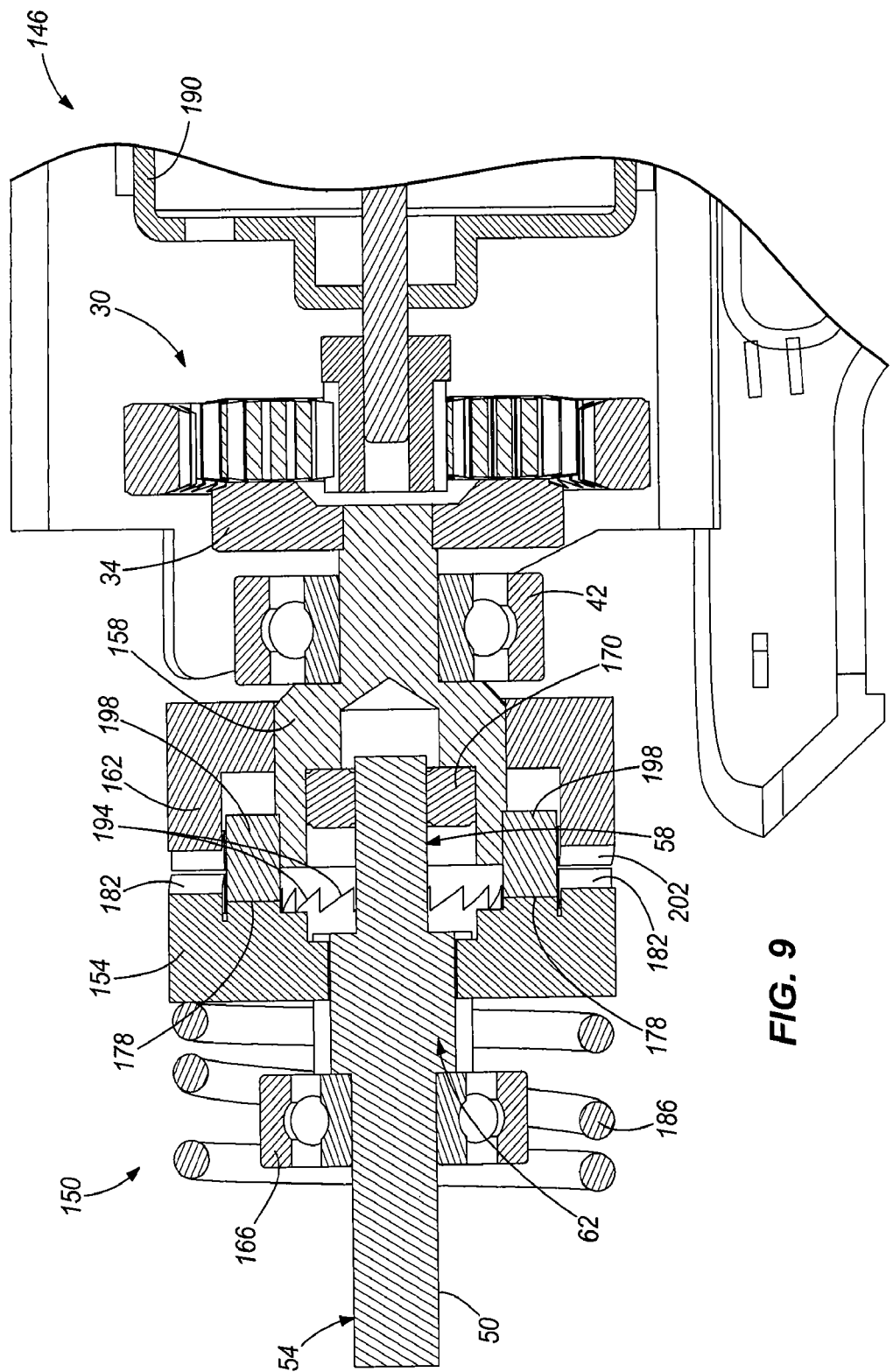
FIG. 9 is a cross-sectional view of the precision torque tool shown in FIG. 8 taken along line 9-9, and illustrating a torque mechanism in a low torque setting.

The torque mechanism 150 includes an output clutch cam 154, a drive shaft 158 and a high clutch cam 162. With reference to FIGS. 9 and 14, the first and second ends 54, 58 of the output shaft 50 are supported by a first bearing 166 and a second bearing 170, respectively. The first bearing 166 maintains axial position of the first end 54 of the output shaft 50 when applying torque to objects. The second bearing 170 supports the second end 58 of the output shaft 50 within the drive shaft 158 and allows the output shaft 50 to rotate with respect to the drive shaft 158. The hub 62 of the output shaft 50 is coupled to and rotates directly with the output clutch cam 154 via mating splines 174 (FIG. 10) formed on the output clutch cam 154 and the hub 62. In other constructions, the output shaft 50 and the output clutch cam 154 are formed as a single, integral part.

Figures 10, 11, 12:
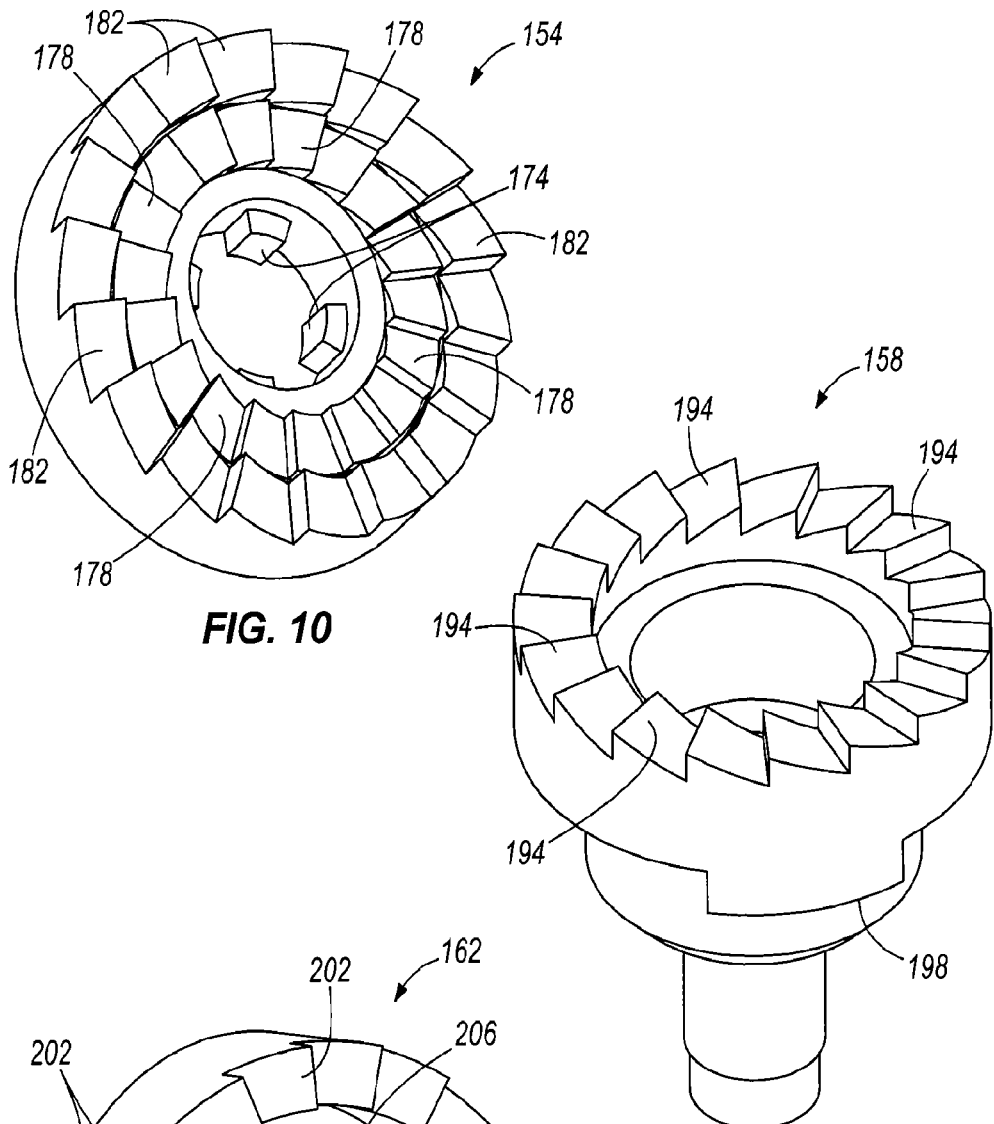
FIG. 10 is a perspective view of an output clutch cam of the torque mechanism shown in FIG. 8.
FIG. 11 is a perspective view of a drive shaft of the torque mechanism shown in FIG. 8, including low cam surfaces.
FIG. 12 is a perspective view of a high clutch cam of the torque mechanism shown in FIG. 8, including high cam surfaces.

With reference to FIG. 10, the output clutch cam 154 includes low cam surfaces 178 and high cam surfaces 182. The low and high cam surfaces 178, 182 are sloped at respective positive angles, whereby the positive angle of each high cam surface 182 is greater than the positive angle of each low cam surface 178. The output clutch cam 154 is forced into engagement with the drive shaft 158 by a first spring 186, that is, the first spring 186 is compressed against the output clutch cam 154 to apply an engaging force on the output clutch cam 154. Although not shown in the drawings, the tool 146 includes a nut (e.g., a nut or bushing similar to the adjustment bushing 66 in the tool 10) threaded to a stationary housing (e.g., a housing similar to the casting 18 shown in FIGS. 1 and 2) at a location proximate the free end of the spring 186 from the point of view of FIGS. 9 and 14, against which the end of the first spring 186 is abutted. As such, the spring 186 is maintained at some level of compression between the nut and the output clutch cam 154.

With reference to FIG. 11, the drive shaft 158 includes low cam surfaces 194 and drive lugs 198. The low cam surfaces 194 face and engage the low cam surfaces 178 of the output clutch cam 154, and have the same positive angle as the low cam surfaces 178 of the output clutch cam 154. The drive lugs 198 are formed opposite of the low cam surfaces 194 and selectively engage the high clutch cam 162. The positive angle of the low cam surfaces 178, 194 determines, in part, the low torque transmitted by the torque tool 150. For example, by increasing the positive angle, the amount of torque that can be transmitted through cam surfaces 178, 194 increases. Similarly, by decreasing the positive angle, the amount of torque that can be transmitted through the cam surfaces 178, 194 decreases.

With reference to FIG. 12, the high clutch cam 162 includes high cam surfaces 202 and driven lugs 206. The high cam surfaces 202 face and selectively engage the high cam surfaces 182 of the output clutch cam 154, and have the same positive angle as the high cam surfaces 182 of the output clutch cam 154. The positive angle of the high cam surfaces 182, 202 determines, in part, the high torque transmitted by the torque tool 150. For example, by increasing the positive angle, the amount of torque that can be transmitted through cam surfaces 182, 202 increases. Similarly, by decreasing the positive angle, the amount of torque that can be transmitted through the cam surfaces 182, 202 decreases.

Alternatively, the tooth-like cam surfaces 178, 182 on the output clutch cam 154 may be replaced with respective concentric friction surfaces that lie in a common plane oriented substantially normal to the output shaft 50. Likewise, the tooth-like cam surfaces 194 on the drive shaft 158 may be replaced with a substantially planar friction surface, and the tooth-like cam surfaces 202 on the high clutch cam 162 may be replaced with a substantially planar friction surface. Particularly, the friction surfaces replacing the low cam surfaces 178, 194 of the output clutch cam 154 and the drive shaft 158, respectively, may include a lower coefficient of friction than the friction surfaces replacing the high cam surfaces 182, 202 on the output clutch cam 154 and the high clutch cam 162, respectively. As a result, when the tool 146 is configured in the low torque setting, only the friction surfaces on the output clutch cam 154 and the drive shaft 158 having the relatively low coefficient of friction would engage. However, when the tool 146 is configured in the high torque setting, the friction surfaces on the output clutch cam 154 and the high clutch cam 162 having the relatively high coefficient of friction would engage, in addition to the engagement of the friction surfaces on the output clutch cam 154 and the drive shaft 158 having the relatively low coefficient of friction.

The driven lugs 206 are formed within the high clutch cam 162 and selectively engage the drive lugs 198 of the drive shaft 158. To engage the drive lugs 198 and the driven lugs 206, the high clutch cam 162 is axially shifted or moved toward the output clutch cam 154 (i.e., toward the left from the point of view of FIGS. 9 and 14). In one construction of the tool 146, a thrust bearing may be positioned adjacent the high clutch cam 162 on the side of the cam 162 opposite the cam surfaces 178, 182, and a thrust washer having at least one radially outwardly-extending tab may be positioned adjacent the thrust washer. The tab may be rotationally constrained within a slot in the previously mentioned stationary housing surrounding the torque mechanism 150. The slot may have a height nominally similar to that of the tab, such that the thrust washer is prevented from co-rotating with the high clutch cam 162 when the cam 162 is engaged with the drive lugs 198 of the drive shaft 158. However, the slot may have a length greater than the thickness of the tab, such that the tab is axially movable within the slot. Therefore, movement of the tab within the slot, in a direction toward the output clutch cam 154, would cause the thrust washer, thrust bearing, and the high clutch cam 162 to move toward the output clutch cam 154, thereby causing the driven lugs 206 on the high clutch cam 162 to engage the drive lugs 198 on the drive shaft 158. In some constructions of the tool 146, the slot may be jogged to define the position of the thrust washer and tab (and therefore the high torque cam 162) when the tool 146 is configured in the high torque setting. In other constructions of the tool 146, the tool 146 may include an adjustment cap having a plurality of interior threads to which the thrust washer and/or the radially outwardly-extending tab are engaged, such that rotation of the adjustment cap results in axial movement of the thrust washer. In other constructions, a lever or a button may be used to shift the high clutch cam 162 toward and away from the output clutch cam 154.

Upon shifting the high clutch cam 162 toward the output clutch cam 154 to engage the driven lugs 206 and the drive lugs 198, the high cam surfaces 182 on the output clutch cam 154 are also engaged by the high cam surfaces 202 on the high clutch cam 162. The force exerted by the spring 186 against the output clutch cam 154 may then be transferred through the surfaces 182, 202 to the high clutch cam 162. Because the ramp angles of the high cam surfaces 182 are greater than those of the low cam surfaces 178, a higher torque may be transferred from the high clutch cam 162 to the output clutch cam 154, compared to the amount of torque that is capable of being transferred from the shaft 158 to the output clutch cam 154 via the low cam surfaces 194, 178. For this to occur, the high clutch cam 162 must be axially secured with respect to the drive shaft 158 (e.g., by locking the thrust washer adjacent and behind the high clutch cam 162 in a jogged slot in a stationary housing surrounding the torque mechanism 150), otherwise, the axial force component exerted on the high cam surfaces 182 would cause the high clutch cam 162 to move away from the output clutch cam 154, ultimately leading to disengagement of the driven lugs 206 from the drive lugs 198. When the driven lugs 206 of the high clutch cam 162 are disengaged from the drive lugs 198 on the drive shaft 158, the high clutch cam 162 rotates freely with respect to the drive shaft 158 and the output clutch cam 154.

To transmit the low torque (e.g., 60 inch-pounds) when the torque mechanism 150 is set in the low torque setting (FIGS. 8 and 9), the first spring 186 applies the engaging force on the output clutch cam 154 to force engagement between the low cam surfaces 178, 194 of the output clutch cam 154 and the drive shaft 158, respectively. A motor 190 rotates the gear set 30 to transmit rotation to the output carrier 34 and the drive shaft 158 coupled thereto. The low cam surfaces 194 of the drive shaft 158 transmit torque to the output clutch cam 154. The output shaft 50 coupled to the output clutch cam 154 transmits torque to the object until the low torque setting is reached.

Once the low torque is reached, torque can no longer be transferred through the engaged drive shaft 158 and the output clutch cam 154, thereby causing the drive shaft 158 to overrun or slip relative to the output clutch cam 154, the rotation of which is slowed or stopped by the reaction torque exerted on the shaft 50 by the fastener being torqued. As the drive shaft 158 slips relative to the output clutch cam 154, the low cam surfaces 178, 194 of the output clutch cam 154 and the drive shaft 158, respectively, are separated and ride over each other. Furthermore, when the low torque is reached and slipping commences, the drive shaft 158 and the output shaft 50 rotate independently of one another, and torque from the drive shaft 158 is diverted from the output shaft 50 or is not transferred to the output shaft 50. Therefore, when the torque tool 150 is in the low torque setting, the output shaft 50 is able to precisely apply the low torque to the fastener and cannot apply torque beyond the low torque to the fastener due to the slipping low cam surfaces 178, 194.

In a similar manner as described above with reference to the tool 10 of FIGS. 1-4B, the nut providing the compression on the spring 186 may be rotated relative to the stationary housing to which it is threaded to increase or decrease the non-calibrated torque of the torque tool 146 (i.e., by increasing or decreasing the pre-load on the spring 186) to achieve the calibrated low torque setting of the tool 146.

With reference to FIGS. 13 and 14, the torque mechanism 150 is set at the high torque setting by shifting the high clutch cam 162 toward the output clutch cam 154 as described above (e.g., by rotating an adjustment cap, etc.) to engage the high cam surfaces 202, 182 of the high clutch cam 162 and the output clutch cam 154, respectively. To operate the torque tool 146 in the high torque setting, the drive shaft 158 is rotated by the motor 190 and thereby transmits rotational movement via the drive lugs 198 to the driven lugs 206 of the high clutch cam 162. The high cam surfaces 202 transmit torque to the high cam surfaces 182 of the output clutch cam 154 and therein to the output shaft 50. In the illustrated construction, the drive shaft 158 also transmits rotation to the output shaft 50 via the low cam surfaces 178, 194 when the reaction torque on the output shaft 50 is below the low torque setting. When the reaction torque on the output shaft 50 approaches the high torque setting, the output clutch cam 154 begins to slip with respect to the high clutch cam 162. Because the ramp angles of the high cam surfaces 182 are greater than the ramp angles of the low cam surfaces 178, the initial slipping of the high cam surfaces 182, 202 of the output clutch cam 154 and the high clutch cam 162, respectively, causes the low cam surfaces 178, 194 of the output clutch cam 154 and the drive shaft 158 to disengage, such that torque is transmitted to the output shaft 50 solely through the high cam surfaces 202 of the high clutch cam 162.

Once the high torque (e.g., 80 inch-pounds) is reached, torque can no longer be transferred through the engaged high clutch cam 162 and the output clutch cam 154, thereby causing the high clutch cam 162 to overrun or slip relative to the output clutch cam 154, the rotation of which is slowed or stopped by the reaction torque exerted on the shaft 50 by the fastener being torqued. As the high clutch cam 162 slips relative to the output clutch cam 154, the high cam surfaces 182, 202 of the output clutch cam 154 and the high clutch cam 162, respectively, are separated and ride over each other. Furthermore, when the high torque is reached and slipping commences, the drive shaft 158 continues to rotate the high clutch cam 162 via the drive lugs 198 and driven lugs 206 respectfully, and torque from the high clutch cam 162 is diverted from the output shaft 50 or is not transferred to the output shaft 50. Thus, when the torque tool 146 is in the high torque setting, the output shaft 50 is able to precisely apply the high torque to the object and cannot apply any additional torque due to the slipping between the low cam surfaces 178, 194 and between the high cam surfaces 182, 202.

To adjust the torque mechanism 150 of the torque tool 146 from the high torque setting to the low torque setting, the high clutch cam 162 is moved axially away from the output clutch cam 154 to disengage the driven lugs 206 from the drive lugs 198. As a result, the high clutch cam 162 is allowed to rotate freely with respect to the output clutch cam 154 and the drive shaft 158.

The tool 146 may also include structure to facilitate independent calibration of the high torque setting (i.e., 80 inch-pounds) from the calibration of the low torque setting (i.e., 60 inch-pounds). For example, the stationary housing surrounding or enclosing the torque mechanism 150 may include a radially outwardly-extending protrusion or tab (not shown) in facing relationship with the radially outwardly-extending tab of the thrust washer behind the high clutch cam 162. A fastener (e.g., a screw) may be engaged with a threaded aperture in the tab on the housing oriented parallel with the shaft 50. The tip of the fastener opposite the head may be used to provide a hard stop against the tab on the thrust washer to limit the extent of the axial movement of the high clutch cam 162 toward the output clutch cam 154.

If the non-calibrated high torque setting is less than the calibrated high torque setting (i.e., 80 inch-pounds), then the manufacturer may increase the engaging force between the cams 154, 162 by backing the fastener out of the tab on the housing (i.e., moving the tip of the fastener to the left from the point of view of FIGS. 9 and 14) to increase the amount of surface area that is in contact between the high cam surfaces 182, 202 of the output clutch cam 154 and the high clutch cam 162, respectively, when the high cam surfaces 182, 202 are engaged. Likewise, if the non-calibrated high torque setting is greater than the calibrated high torque setting (i.e., 80 inch-pounds), then the manufacturer may decrease the engaging force between the cams 154, 162 by further threading the fastener into the tab on the housing (i.e., moving the tip of the fastener to the right from the point of view of FIGS. 9 and 14) to reduce the amount of surface area that is in contact between the high cam surfaces 182, 202 of the output clutch cam 154 and the high clutch cam 162, respectively, when the high cam surfaces 182, 202 are engaged.

Figure 15:
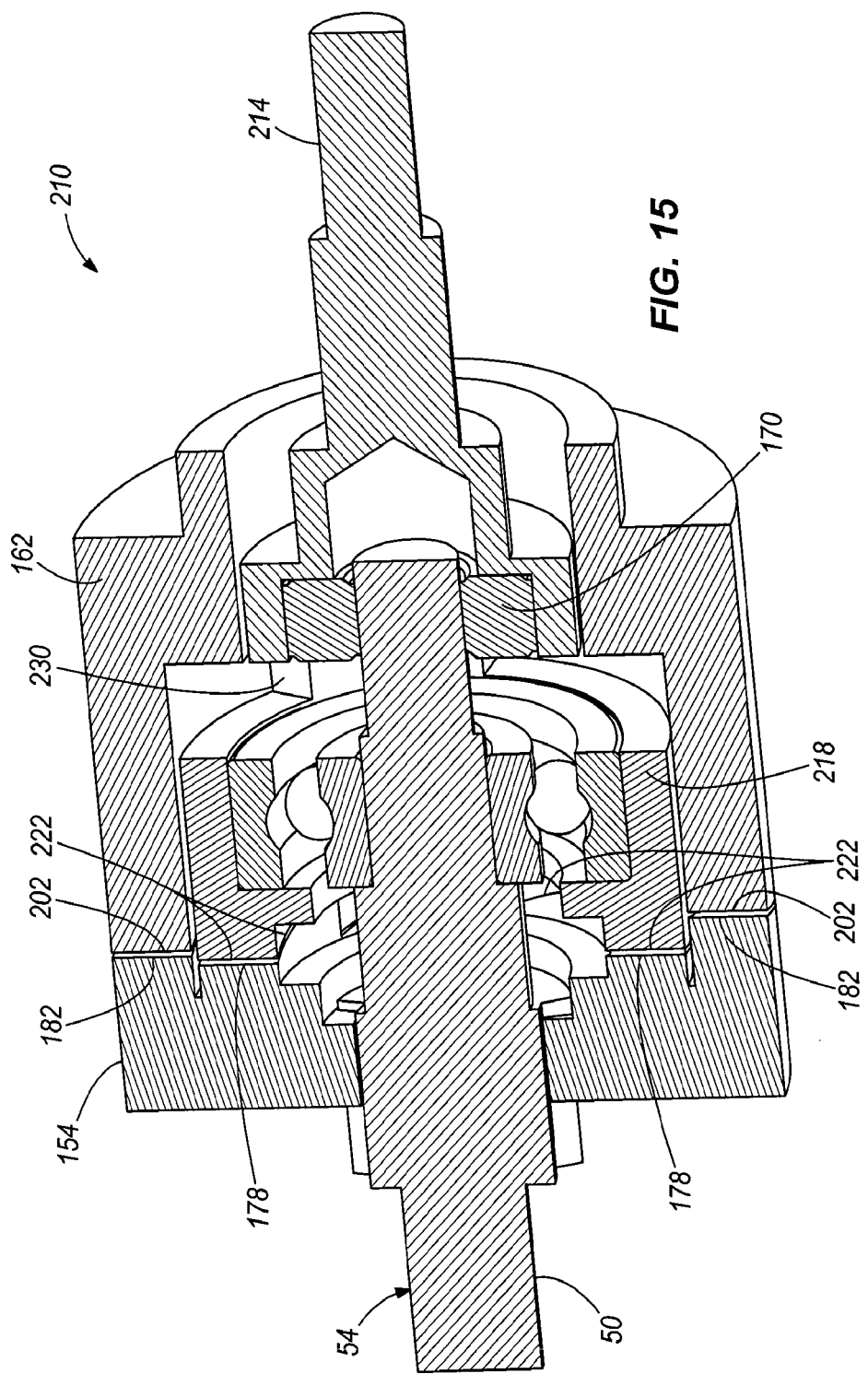
FIG. 15 is a cross-sectional view of a torque mechanism according to another construction of the invention.

FIG. 15 illustrates a torque mechanism 210 according to another construction of the invention. The torque mechanism 210 is similar to the torque mechanism 150 shown in FIGS. 8, 9, 13 and 14; therefore like structure is identified by the same reference numerals. The torque mechanism 210 is configured for use in the torque tool 146 shown in FIGS. 8, 9, 13 and 14 in the place of the torque mechanism 150.

Figure 16:
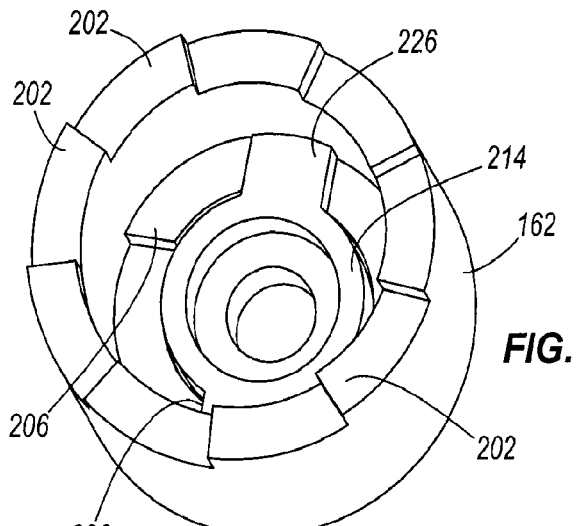
FIG. 16 is a perspective view of a portion of the torque mechanism shown in FIG. 15, including a drive shaft and a high clutch cam in a high torque setting.
Figure 18:
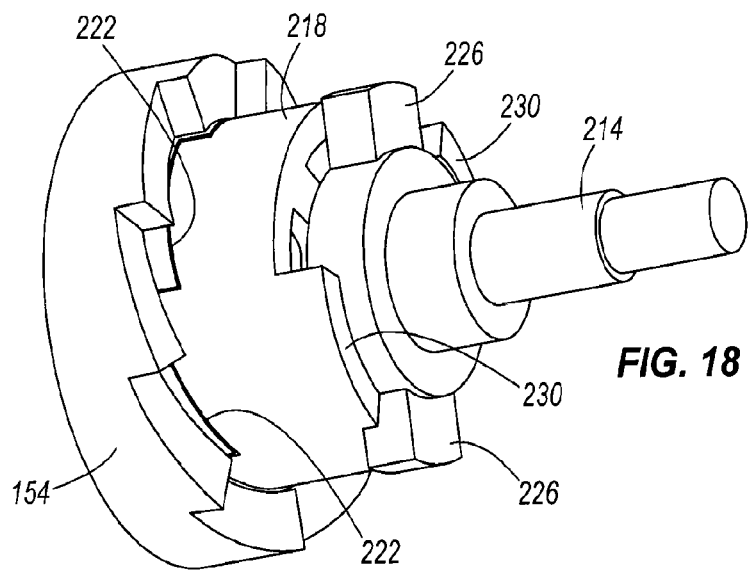
FIG. 18 is a perspective view of a portion of the torque mechanism shown in FIG. 15, including an output clutch cam and a low clutch cam in a low torque setting.

The torque mechanism 210 includes a drive shaft 214 and a low clutch cam 218. The drive shaft 214 includes drive lugs 226 (FIGS. 16 and 18). The low clutch cam 218 includes low cam surfaces 222 and driven lugs 230. An adjustment cap or lever (not shown) is actuated by the user to axially shift the drive shaft 214. Depending upon the axial position of the drive shaft 214, the drive shaft 214 alternates engagement of the drive lugs 226 between the driven lugs 206 of the high clutch cam 162 (FIG. 16) and the driven lugs 230 of the low clutch cam 218 (FIG. 18).

The torque mechanism 210 operates at a high torque setting and a low torque setting. In the high torque setting, the torque mechanism outputs a precise high torque (e.g., 80 inch-pounds) and in the low torque setting, the torque mechanism outputs a precise low torque (e.g., 60 inch-pounds). The first spring 186 (FIGS. 8, 9, 13 and 14) applies an engaging force on the output clutch cam 154, thus pushing the output clutch cam 154 against the high clutch cam 162 and the low clutch cam 218 such that the force between the low cam surfaces 178, 222 is the same as the force between the high cam surfaces 182, 202.

The high torque and the low torque for the torque mechanism 210 are determined and defined by the positive angles of the high cam surfaces 182, 202 and the low cam surfaces 178, 222, respectively. The precise, high torque of the torque mechanism 210 is set by the positive angle of the high cam surfaces 182, 202. For example, the greater the positive angle of the high cam surfaces 182, 202, the greater the high torque that is applied to the output clutch cam 154. Similarly, the precise, low torque of the torque mechanism 210 is determined by the positive angle of the low cam surfaces 178, 222. The positive angle of the high cam surfaces 182, 202 is greater than the positive angle of the low cam surfaces 178, 222. Accordingly, by modifying the positive angles of the high and low cam surfaces, the torque mechanism 210 can precisely achieve the desired high torque and low torque.

The torque setting (high or low) of the torque mechanism 210 is determined based on the axial position of the drive shaft 214. As discussed above, the adjustment cap axially shifts the drive shaft 214 to place the drive lugs 226 in engagement with either the high clutch cam 162 or the low clutch cam 218. If the drive lugs 226 of the drive shaft 214 are engaged with the driven lugs 206 of the high clutch cam 162 then the torque mechanism 210 outputs the high torque. Alternately, if the drive lugs 226 of the drive shaft 214 are engaged with the driven lugs 230 of the low clutch cam 218 then the torque mechanism 210 outputs the low torque.

Figure 17:
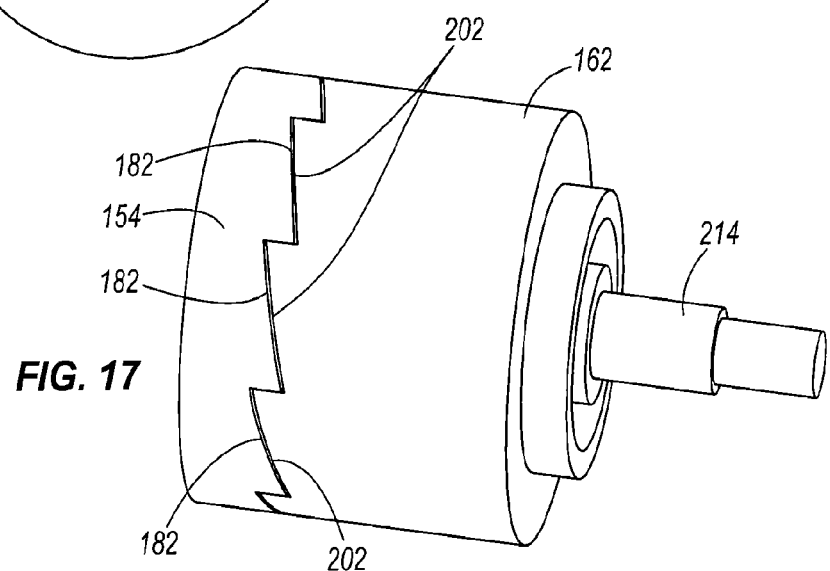
FIG. 17 is another perspective view of a portion of the torque mechanism shown in FIG. 15, illustrating the torque mechanism in the high torque setting.

In the high torque setting (FIGS. 15-17), the first spring 186 applies the engaging force on the output clutch cam 154, thus pushing the output clutch cam 154 against the high clutch cam 162 and the low clutch cam 218. With reference to FIG. 16, the drive lugs 226 of the drive shaft 214 engage the driven lugs 206 of the high clutch cam 162 and thus, transmit torque to the high clutch cam 162. With reference to FIG. 17, the torque is transmitted via the high cam surfaces 182, 202 to the output shaft 50 (FIG. 15). Since the drive lugs 226 are not engaged with the driven lugs 230 of the low clutch cam 218, the low clutch cam 218 freely rotates with the output clutch cam 154, but does not transmit any torque do the output clutch cam 154.

Once the high torque (e.g., 80 inch-pounds) is reached, the output clutch cam 154 overcomes the engaging force between the high cam surfaces 182, 202 of the output clutch cam 154 and the high clutch cam 162, respectively, thus separating the two surfaces 182, 202. The separation results in sliding or slipping between the high cam surfaces 182, 202. Furthermore, when the high torque is reached and slipping commences, the drive shaft 158 continues to rotate the high clutch cam 162 via the drive lugs 226 and driven lugs 206; however, the high clutch cam 162 does not transmit torque (beyond the high torque) to the output shaft 50. Therefore, when the torque tool 146 is in the high torque setting, the output shaft 50 is able to precisely apply the high torque to the object and cannot apply any additional torque due to the slipping between the low cam surfaces 178, 222 and between the high cam surfaces 182, 202.

In the low torque setting (FIG. 18), the first spring 186 applies the engaging force on the output clutch cam 154, thus continuing to apply the same engaging force against the high clutch cam 162 and the low clutch cam 218. With reference to FIG. 18, the drive lugs 226 of the drive shaft 214 engage the driven lugs 230 of the low clutch cam 218 and thus, transmit torque to the low clutch cam 218. The torque is transmitted via the low cam surfaces 178, 222 to the output shaft 50. Since the drive lugs 226 are not engaged with the driven lugs 206 of the high clutch cam 162, the high clutch cam freely rotates with the output clutch cam 154, but does not transmit any torque do the output clutch cam 154.

Once the low torque (e.g., 60 inch-pounds) is reached, the output clutch cam 154 overcomes the engaging force between the cam surfaces 178, 222 of the output clutch cam 154 and the low clutch cam 218, respectively, thus separating the two surfaces 178, 222. The separation results in sliding or slipping between the low cam surfaces 178, 222. Furthermore, when the low torque is reached and slipping commences, the drive shaft 158 continues to rotate the low clutch cam 218 via the drive lugs 226 and driven lugs 230; however, the low clutch cam 218 does not transmit torque (beyond the low torque) to the output shaft 50. Therefore, when the torque tool 146 is in the low torque setting, the output shaft 50 is able to precisely apply the low torque to the object and cannot apply any additional torque due to the slipping between the low cam surfaces 178, 222 and between the high cam surfaces 182, 202.

Figure 19:
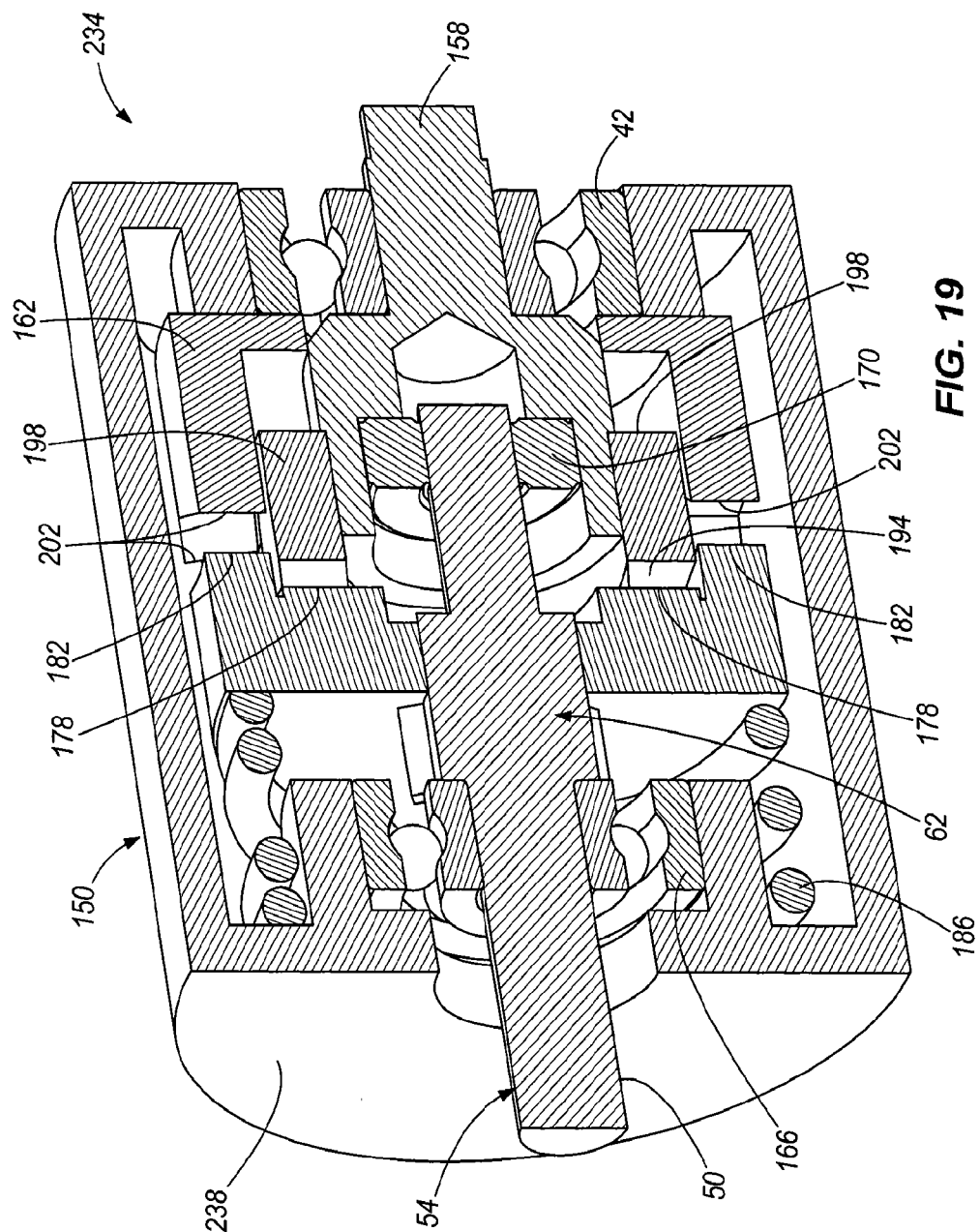
FIG. 19 is a cross-sectional view of a torque adapter according to another construction of the invention.

FIG. 19 illustrates an adapter 234 according to another construction of the invention. The adapter 234 is similar the torque tool 146 shown in FIGS. 8-14; therefore like structure will be identified by the same reference numerals. The adapter 234 includes a housing 238. The torque mechanism 150, a portion of the drive shaft 158 and a portion of the output shaft 50 are positioned within the housing 238. The portion of the drive shaft 158 that extends from the housing 238 is able to be coupled to and driven by a power tool, such as a battery operated drill.

Figure 20:
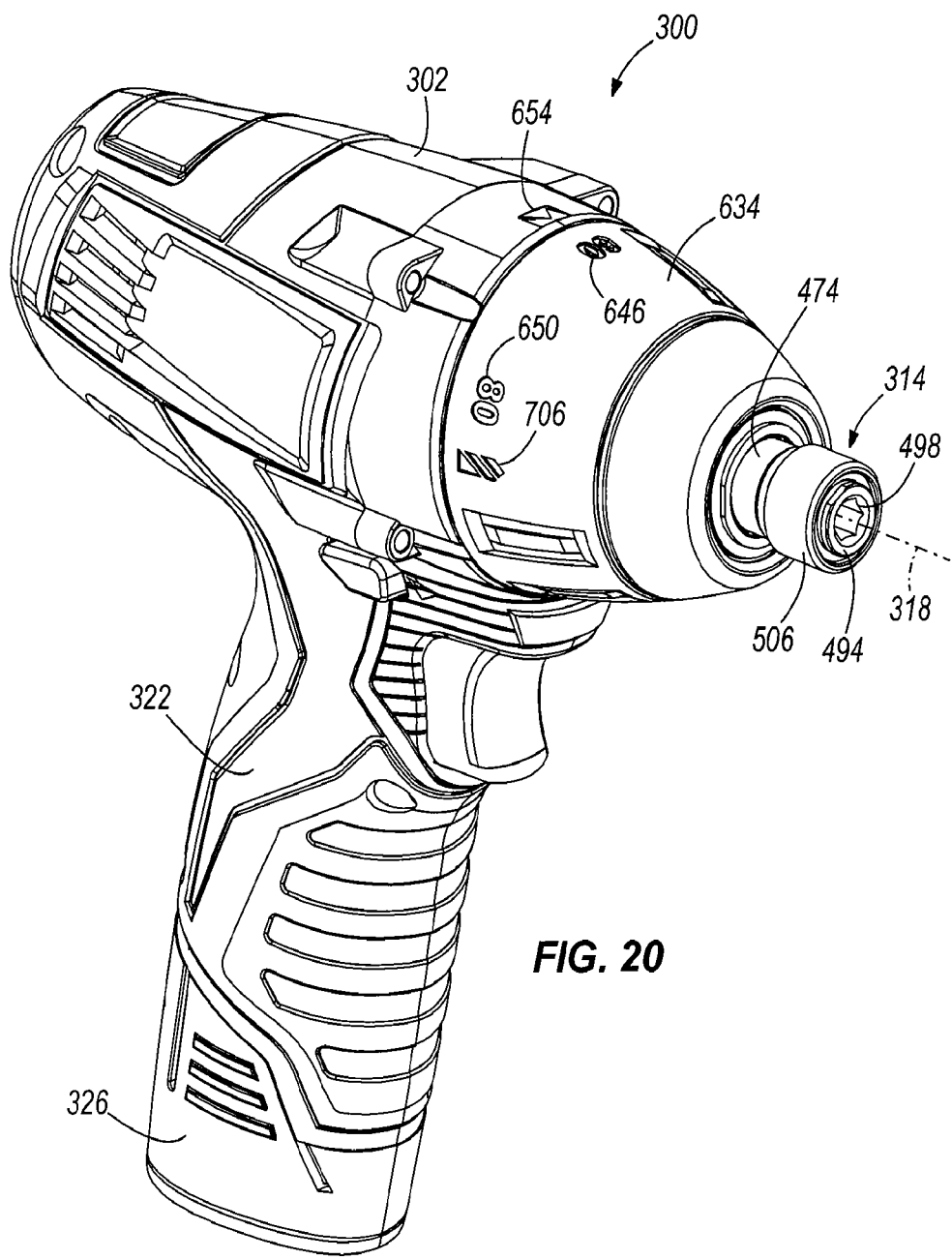
FIG. 20 is a front perspective view of a precision torque tool according to another construction of the invention.

FIG. 20 illustrates a precision torque tool 300 according to another construction of the invention. The tool 300 applies a precise amount of torque on objects without over-tightening or over-torquing the objects. In some constructions, the tool 300 includes one or more precise torque settings for applications related to plumbing. For example, a user (e.g., a plumber) may operate the tool 300 to apply a torque on a clamping band of a no-hub pipe coupling. Alternatively, the tool 300 may apply a torque on fasteners and/or other components that threadably mate with one another. In the illustrated construction, the tool 300 is a hand-held tool 300 operated by a user. Alternatively, the tool 300 may be modified for use on an assembly line and may be operated by a user or a robot (e.g., an automated machine).

As will be discussed in more detail below, the torque applied by the tool 300 is adjustable. Depending on the application, the user may adjust the torque settings of the tool 300 to apply various and precise amounts of torque to an object. In the illustrated construction of the tool 300, a user selects between a first, low torque setting (e.g., 60 inch-pounds) and a second, high torque setting (e.g., 80 inch-pounds). Alternatively, the tool 300 may be configured having different discrete torque settings besides 60 inch-pounds and 80 inch-pounds, or the tool 300 may be configured having more than two different discrete torque settings. As a further alternative, the tool 300 may be configured to apply a variable amount of torque rather than discrete torque settings. That is, the tool 300 may be adjusted to apply any level of torque between the first and second torque settings.

Figure 21:
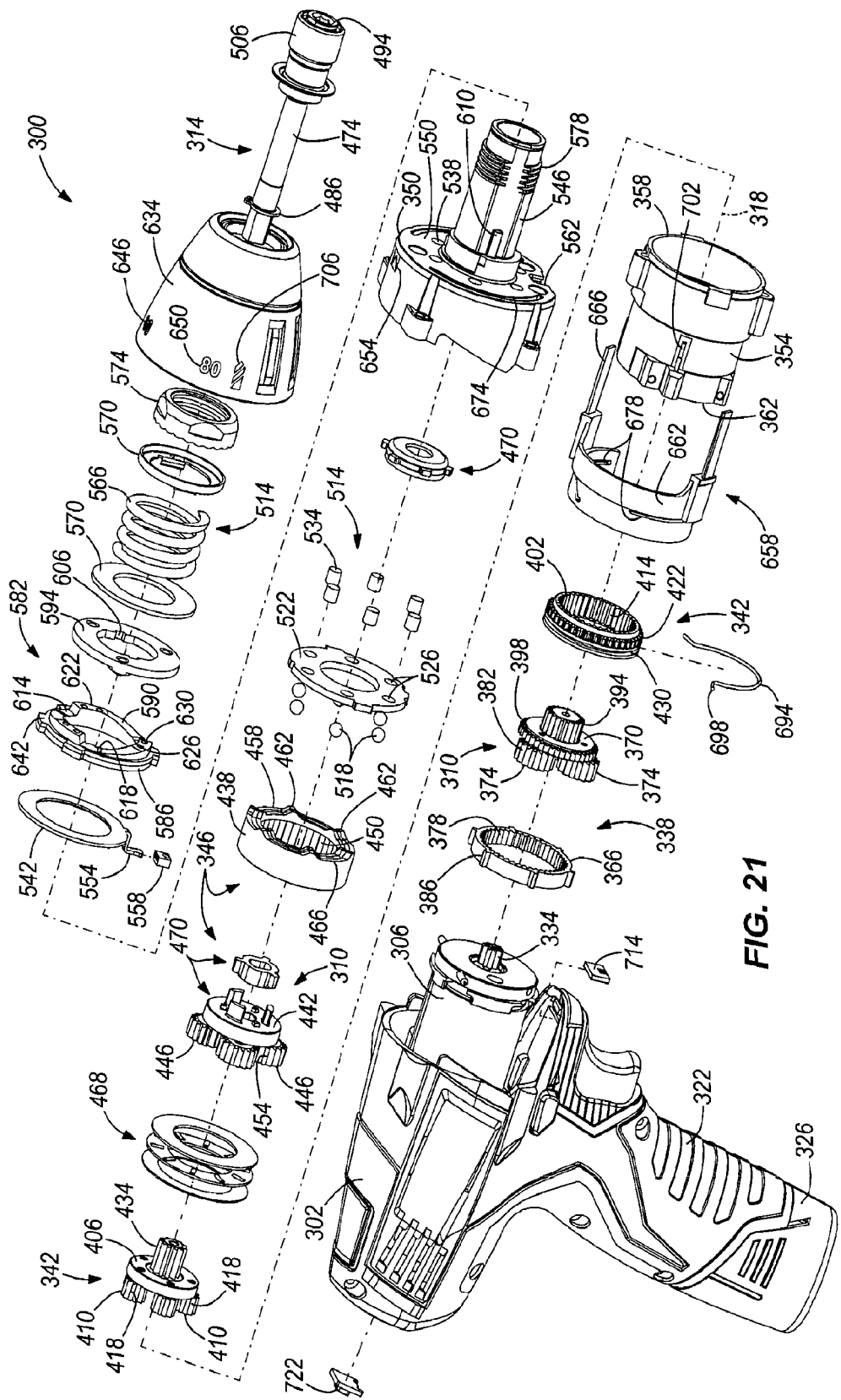
FIG. 21 is an exploded, front perspective view of the precision torque tool of FIG. 20.
Figure 22:
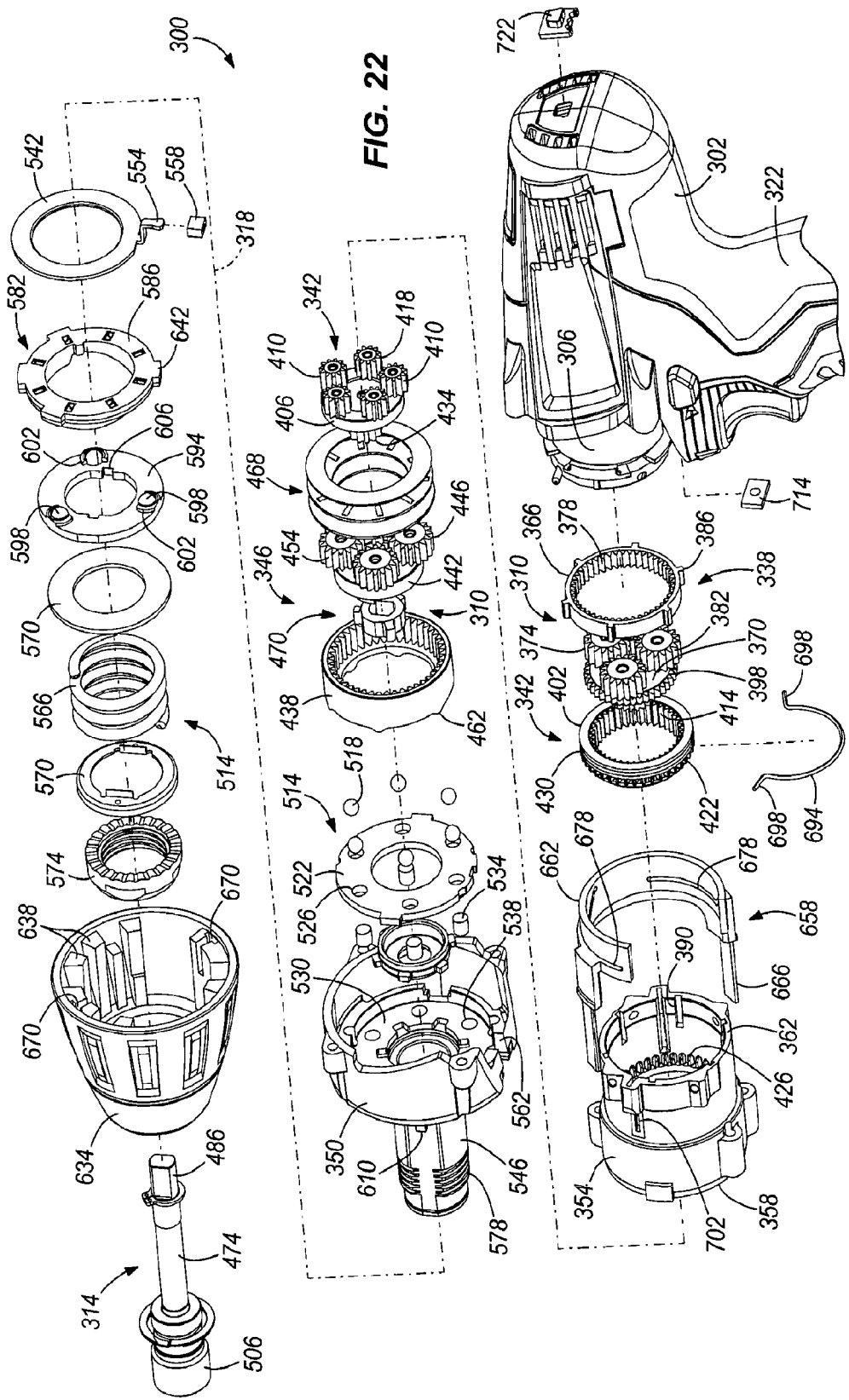
FIG. 22 is an exploded, rear perspective view of the precision torque tool of FIG. 20.

With reference to FIGS. 20-22, the tool 300 includes a housing 302, a motor 306 supported in the housing 302, a transmission 310 operably coupled to the motor 306 to receive torque from the motor 306, and an output shaft 314 rotatable about a central axis 318 and operably coupled to the transmission 310 to receive torque from the transmission 310. In the illustrated construction of the tool 300, the housing 302 includes a handle 322 in which a battery pack 326 is received. The battery pack 326 is electrically connected 306 to the motor to provide power to the motor 306. The battery pack 326 is a 12-volt power tool battery pack 326 and includes three lithium-ion battery cells. Alternatively, the battery pack 326 may include fewer or more battery cells to yield any of a number of different output voltages (e.g., 14.4 volts, 18 volts, etc.). Additionally or alternatively, the battery cells may include chemistries other than lithium-ion such as, for example, nickel cadmium, nickel metal-hydride, or the like. Alternatively, the battery pack 326 may be coupled to a different portion of the tool housing 302 (e.g., a motor support portion of the housing 302). As a further alternative, the tool 300 may include an electrical cord for connecting the motor 306 to an electrical source (e.g., a wall outlet).

Figure 24:
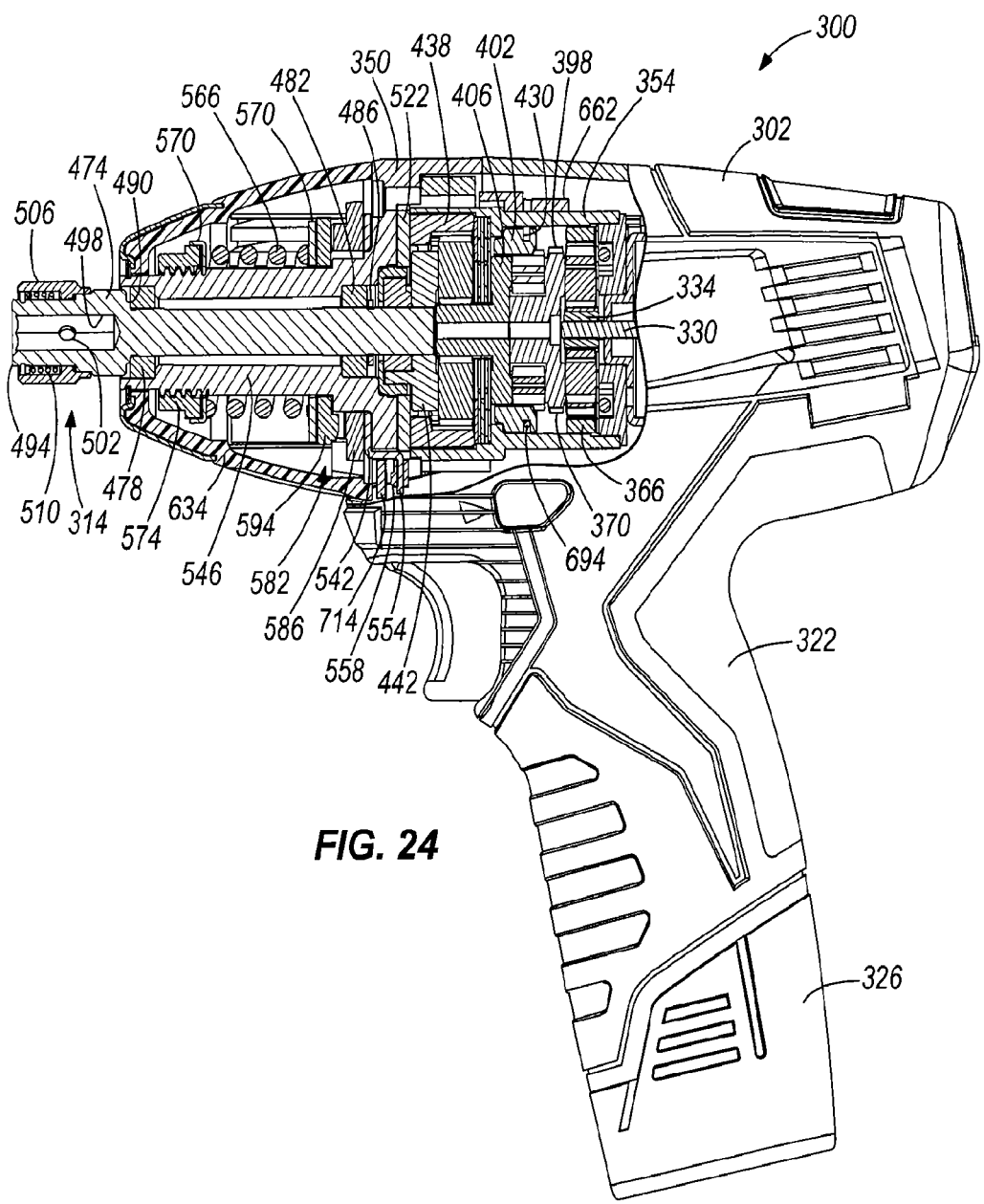
FIG. 24 is a side, partial cutaway view of the precision torque tool of FIG. 20, illustrating the precision torque tool in the first torque setting.

The motor 306 is configured as a direct-current, can-style motor 306 having an output shaft 330 upon which a pinion 334 is fixed for rotation (FIG. 24). In the illustrated construction of the tool 300, the pinion 334 is interference or press-fit to the output shaft 330. Alternatively, the pinion 334 may be coupled for co-rotation with the output shaft 330 in any of a number of different ways (e.g., using a spline fit, a key and keyway arrangement, by welding, brazing, using adhesives, etc.). As a further alternative, the pinion 334 may be integrally formed as a single piece with the output shaft 330.

With reference to FIGS. 21 and 22, the transmission 310 is configured as a three-speed transmission 310 including a first stage planetary transmission 338, a second stage planetary transmission 342, and a third stage planetary transmission 346. The transmission 310 also includes a front transmission housing 350 and a rear transmission housing 354 within which the first, second, and third stage planetary transmissions 338, 342, 346 are received. Specifically, the first, second, and the third stage planetary transmissions 338, 342, 346 are positioned between a front end 358 and a rear end 362 of the rear transmission housing 354, with the front end 358 of the rear transmission housing 354 being received within the front transmission housing 350 and the motor 300 being coupled to the rear end 362 of the rear transmission housing 354 (FIG. 24). In the illustrated construction of the tool 300, the front and rear transmission housings 350, 354 are coupled using fasteners (not shown), and the unitized front and rear transmission housings 350, 354 are coupled to the tool housing 302 using fasteners (not shown). Alternatively, the front transmission housing 350, the rear transmission housing 354, and the housing 302 may be coupled to each other in any of a number of different ways (e.g., using snap-fits, using adhesives, by welding, etc.). As a further alternative, the front and rear transmission housings 350, 354 may be integrally formed as a single piece. As yet another alternative, the transmission 310 may be configured as a parallel-axis gear train rather than utilizing the first, second, and third stage planetary transmissions 338, 342, 346.

With reference to FIGS. 21 and 22, the first stage planetary transmission 338 includes an outer ring gear 366, a carrier 370 rotatable about the central axis 318, and a plurality of planet gears 374 rotatably coupled to the carrier 370 about respective axes radially spaced from the central axis 318. The outer ring gear 366 includes a plurality of radially inwardly-extending teeth 378 that are engageable by corresponding teeth 382 on the planet gears 374. The outer ring gear 366 also includes a plurality of radially outwardly-extending protrusions 386, and the rear transmission housing 354 includes a corresponding plurality of slots 390 (FIG. 22) within which the protrusions 386 are received to rotationally fix the outer ring gear 366 to the rear transmission housing 354, and therefore the tool housing 302. Alternatively, the outer ring gear 366 may be fixed to the rear transmission housing 354 in any of a number of different ways (e.g., using snap-fits, an interference or press-fit, fasteners, adhesives, by welding, etc.) As a further alternative, the outer ring gear 366 may be integrally formed as a single piece with the rear transmission housing 354.

With reference to FIG. 21, the carrier 370 includes a sun gear 394 that is co-rotatable with the carrier 370 and the planet gears 374 about the central axis 318. In the illustrated construction of the tool 300, the sun gear 394 is integrally formed as a single piece with the carrier 370. Alternatively, the sun gear 394 may be a separate and distinct component from the carrier 370, and coupled to the carrier 370 for co-rotation with the carrier 370 in any of a number of different ways (e.g., using an interference or press-fit, fasteners, adhesives, by welding, etc.). The carrier 370 also includes a plurality of radially outwardly-extending teeth 398 arranged about the outer circumferential surface of the carrier 370, the purpose of which is explained in detail below.

With reference to FIGS. 21 and 22, the second stage planetary transmission 342 includes an outer ring gear 402, a carrier 406 rotatable about the central axis 318, and a plurality of planet gears 410 rotatably coupled to the carrier 406 about respective axes radially spaced from the central axis 318. The outer ring gear 402 includes a plurality of radially inwardly-extending teeth 414 that are engageable by corresponding teeth 418 on the planet gears 410. The outer ring gear 402 also includes a plurality of radially outwardly-extending teeth 422 arranged about the outer circumferential surface of the outer ring gear 402, and the rear transmission housing 354 includes a corresponding plurality of radially inwardly-extending teeth 426 (FIG. 22) that are selectively engageable with the radially outwardly-extending teeth 422 on the outer ring gear 402 to selectively rotationally fix the outer ring gear 402 to the rear transmission housing 354, and therefore the tool housing 302. The outer ring gear 402 also includes a circumferential groove 430 positioned adjacent the radially outwardly-extending teeth 422, the purpose of which is explained in detail below.

With reference to FIG. 21, the carrier 406 includes a sun gear 434 that is co-rotatable with the carrier 406 and the planet gears 410 about the central axis 318. In the illustrated construction of the tool 300, the sun gear 434 is integrally formed as a single piece with the carrier 406. Alternatively, the sun gear 434 may be a separate and distinct component from the carrier 406, and coupled to the carrier for co-rotation with the carrier 406 in any of a number of different ways (e.g., using an interference or press-fit, fasteners, adhesives, by welding, etc.).

With reference to FIGS. 21 and 22, the third stage planetary transmission 346 includes an outer ring gear 438, a carrier 442 rotatable about the central axis 318, and a plurality of planet gears 446 rotatably coupled to the carrier 442 about respective axes radially spaced from the central axis 318. The outer ring gear 438 includes a plurality of radially inwardly-extending teeth 450 that are engageable by corresponding teeth 454 on the planet gears 446. The outer ring gear 438 also includes an end face 458 having a plurality of axially-extending protrusions 462 and a plurality of grooves 466 defined between adjacent protrusions 462 (FIG. 21), the purpose of which is discussed in detail below. The tool 300 includes a thrust washer assembly 468 positioned between the rear transmission housing 354 and the outer ring gear 438 to facilitate rotation of the outer ring gear 438 with respect to the rear transmission housing 354, as discussed in more detail below.

The output shaft 314 is coupled for co-rotation with the carrier 442 via a spindle lock assembly 470 operable to fix the output shaft 314 to the tool housing 302 to facilitate changing a tool bit coupled to the output shaft 314. Such spindle lock assemblies 470 are known in the art and therefore will not be described in detail herein. In the illustrated construction of the tool 300, a portion of the spindle lock assembly 470 is integrally formed with the carrier 442. Alternatively, the spindle lock assembly 470 may be omitted from the tool 300, such that the output shaft 314 may be coupled directly to the carrier 442 for co-rotation with the carrier 442. In such a construction of the tool 300, a portion of the output shaft 314 may be integrally formed as a single piece with the carrier 442.

With reference to FIGS. 21, 22, and 24, the output shaft 314 includes a spindle 474 rotatably supported within the front transmission housing 350 by respective front and rear bearings 478, 482. In the illustrated construction of the tool 300, the bearings 478, 482 are configured as sleeve bearings or bushings, each having an outer peripheral surface that is interference or press-fit to the front transmission housing 350 to axially secure the bearings 478, 482 to the front transmission housing 350. A clip 486 is coupled to the spindle 474 and positioned rearward of the bearing 482 to substantially prevent axial movement of the spindle 474 in a forward direction (i.e., away from the motor 306) relative to the front transmission housing 350 (FIG. 24). The spindle 474 also includes a shoulder 490 against which the bearing 478 is abutted to substantially prevent axial movement of the spindle 474 in a rearward direction (i.e., toward the motor 306). Alternatively, the bearings 478, 482 may be configured as ball bearings, roller bearings, etc.

With continued reference to FIG. 24, the spindle 474 includes a drive end 494 having a non-cylindrical bore 498 within which a fastener or a tool bit may be received. In the illustrated construction of the tool 300, the non-cylindrical bore 498 includes a hexagonal cross-sectional shape (FIG. 20). However, the non-cylindrical bore 498 may be shaped in any of the number of different ways to receive any of a number of different fasteners and/or tool bits. The output shaft 314 also includes a detent 502 utilized to lock or axially secure the fastener and/or tool bit to the drive end 494 of the spindle 474, a sleeve 506 positioned over the drive end 494 of the spindle 474 for actuating the detent 502 between a locked and unlocked configuration, and a biasing member (e.g., a compression spring 510) for biasing the sleeve 506 toward a position in which the detent 502 is in the locked configuration. Alternatively, the detent 502, the sleeve 506, and the spring 510 may be omitted from the output shaft 314, such that the fastener and/or tool bit is not lockable to the drive end 494 of the spindle 474.

With reference to FIGS. 21, 22, and 24, the precision torque tool 300 includes a clutch mechanism 514 supported by the front transmission housing 350. As will be explained in more detail below, the clutch mechanism 514 is operable to selectively divert torque output by the motor 306 away from the output shaft 314 and toward a portion of the transmission 310 when a reaction torque on the output shaft 314 exceeds a predetermined torque setting (e.g., a reaction torque provided by a fastener and/or tool bit coupled to the drive end 494 of the spindle 474). In the illustrated construction of the tool 300, the clutch mechanism 514 includes a plurality of cam members (e.g., spherical rollers or balls 518) and an alignment plate 522 having a corresponding plurality of apertures 526 radially spaced from the central axis 318 (FIG. 21). The plate 522 is positioned between an axially-facing, interior face 530 of the front transmission housing 350 (FIG. 22) and the end face 458 of the outer ring gear 438, such that the balls 518 are at least partially positioned within the respective apertures 526 in the plate 522 and are at least partially received within the respective grooves 466 in the end face 458. The clutch mechanism 514 also includes a plurality of cylindrical pins 534 disposed within a corresponding plurality of apertures 538 in the front transmission housing 350 radially spaced about the central axis 318 (FIG. 21). The pins 534 are engaged with the respective balls 518, such that the pins 534 and balls 518 move together in a direction parallel to the central axis 318 relative to the respective apertures 526, 538 in the plate 522 and the front transmission housing 350 during operation of the clutch mechanism 514. Alternatively, the respective pins 534 and balls 518 may be configured as a unitary cam member having any of a number of different shapes.

With reference to FIGS. 21, 22, and 24, the clutch mechanism 514 also includes a washer 542 supported on a nose portion 546 of the front transmission housing 350 coaxial with the central axis 318. The washer 542 is positioned adjacent an axially-facing, exterior face 550 of the front transmission housing 350, such that the cylindrical pins 534 disposed within the apertures 538 in the front transmission housing 350 are engaged with the washer 542: The washer 542 includes an L-shaped tab or arm 554 extending from the outer peripheral surface of the washer 542 to which an elastomeric pad 558 is coupled (e.g., using a snap-fit, an interference or press-fit, etc.). The arm 554 is received within a slot 562 in the front transmission housing 350 to substantially prevent relative rotation between the washer 542 and the front transmission housing 350 (FIG. 22).

With reference to FIGS. 21, 22, and 24, the clutch mechanism 514 further includes a resilient member (e.g., a compression spring 566) positioned over the nose portion 546 of the front transmission housing 350, respective spring retainers 570 positioned on either end of the spring 566, and a fastener (e.g., a nut 574) threaded to a threaded portion 578 of the nose portion 546 to axially secure the washer 542, the spring 566, and the respective spring retainers 570 between the exterior face 550 of the front transmission housing 350 and the nut 574. As is described in more detail below, the spring 566 is operable to bias the washer 542 against the exterior face 550 of the front transmission housing 350. Alternatively, an elastomeric component may be substituted for the compression spring 566. Also, as is discussed in more detail below, the nut 574 is threaded to a precise location on the nose portion 546 of the front transmission housing 350 to calibrate the low torque setting (e.g., 60 inch-pounds) of the tool 300

With reference to FIGS. 21 and 22, the precision torque tool 300 also includes a clutch mechanism adjustment assembly 582 including a first or a cam ring 586 rotatable about the central axis 318 and having a plurality of cam surfaces 590 radially spaced from the central axis 318, a second or a follower ring 594 coaxial with the cam ring 586 and in facing relationship with the cam surfaces 590 of the cam ring 586, and a plurality of cam members 598 disposed between the respective cam surfaces 590 and the follower ring 594. As is described in more detail below, the clutch mechanism adjustment assembly 582 is operable to set the particular torque at which the clutch mechanism 514 slips.

In the illustrated construction of the tool 300, the cam members 598 are configured as spherical rollers 598 retained within respective pockets 602 formed in the follower ring 594 (FIG. 22). Alternatively, the cam members 598 may be configured as axially extending protrusions on the follower ring 594 that are integrally formed with the follower ring 594. The follower ring 594 also includes opposed slots or keyways 606 within which axially-extending protrusions or keys 610 on the nose portion 546 of the front transmission housing 350 are received. Such a key or keyway connection between the follower ring 594 and the nose portion 546 allows the follower ring 594 to move along the central axis 318 but prevents relative rotation between the follower ring 594 and the front transmission housing 350.

With reference to FIG. 21, each of the cam surfaces 590 on the cam ring 586 is inclined relative to the central axis 318, such that relative rotation between the cam ring 586 and the follower ring 594 causes the spherical rollers 598 to ride up the respective cam surfaces 590 and displace the follower ring 594 from the cam ring 586 along the central axis 318. The cam ring 586 also includes a low-elevation, non-inclined surface 614 and a ridge 618 disposed adjacent one end of each of the cam surfaces 590, and a high-elevation, non-inclined surface 622 disposed adjacent the other end of each of the cam surfaces 590. The cam ring 586 further includes a pair of recesses 626, 630 disposed in each of the surfaces 622 within which one of the spherical rollers 598 may be positioned. As is discussed in more detail below, the spherical rollers 598 may be engaged with the low-elevation, non-inclined surfaces 614 to define a first rotational position of the cam ring 586 relative to the follower ring 594, while the spherical rollers 598 may be positioned in the respective recesses 626 or 630 to define a second rotational position of the cam ring 586 relative to the follower ring 594. As a result of the spherical rollers 598 riding up the respective cam surfaces 590 on the cam ring 586 between the first and second rotational positions, the first rotational position is associated with a first axial spacing between the rings 586, 594, while the second rotational position is associated with a second axial spacing between the rings that is greater than the first axial spacing. Therefore, a different preload is exerted on the compression spring 566 when the cam ring 586 is in the first rotational position, as opposed to when the cam ring 586 is in the second rotational position, causing the clutch mechanism 514 to slip at different torque settings commensurate with the amount of preload of the spring 566.

With reference to FIGS. 20-22, the clutch mechanism adjustment assembly 582 also includes a mode selector ring 634 coaxially mounted to the nose portion 546 of the front transmission housing 350 for rotation relative to the front transmission housing 350. The mode selector ring 634 includes a plurality of radially inwardly-extending ribs 638, and the cam ring 586 includes a plurality of radially outwardly-extending tabs 642 configured to be received between adjacent ribs 638 on the mode selector ring 634 (FIG. 22). As a result, the cam ring 586 is co-rotatable with the mode selector ring 634. Alternatively, the mode selector ring 634 and the cam ring 586 may utilize any of a number of different structural arrangements to fix the cam ring 586 for co-rotation with the mode selector ring 634.

With reference to FIG. 20, the mode selector ring 634 includes a plurality of icons 646, 650 that provide a visual indication to the user of the tool 300 when the cam ring 586 is positioned in the first and second positions relative to the follower ring 594. Specifically, when aligned with a marking 654 on the front transmission housing 350, the icon 646 communicates to the user of the tool 300 that the cam ring 586 is in the first position relative to the follower ring 594 to yield a first torque setting. Likewise, when aligned with the marking 654 on the front transmission housing 350, the icon 650 communicates to the user of the tool 300 that the cam ring 586 is in the second position relative to the follower ring 594 to yield a second torque setting different than the first torque setting. Receipt of the spherical rollers 598 in the recesses 626 also provides a tactile indicator that the tool 300 has been adjusted to the second torque setting. In the illustrated constriction of the tool 300, each of the icons 646, 650 is configured as a numeral corresponding to the particular torque setting associated with the first and second positions of the cam ring 586 relative to the follower ring 594 (i.e., 60 inch-pounds and 80 inch-pounds, respectively). Alternatively, the icons 646, 650 may be differently configured to communicate to the user of the tool 300 the difference between the particular torque settings associated with the first and second positions of the cam ring 586 relative to the follower ring 594 (e.g., icons designating low and high torque settings).

The clutch mechanism 514 is pre-calibrated to output a precise, low torque value (e.g., 60 inch-pounds) in the first, low torque setting and a precise, high torque value (e.g., 80 inch-pounds) in the second, high torque setting. Calibration of the clutch mechanism 514 is performed by the manufacturer of the tool 300; however, the clutch mechanism 514 may be calibrated by non-OEM service providers or by the end users of the tool 300.

If the non-calibrated torque is less than the calibrated low torque (i.e., 60 inch-pounds), then the engaging force between the balls 518 and the protrusions 462 on the outer ring gear 438 may be increased by rotating the nut 574 on the nose portion 546 of the front transmission housing 350 in one direction to increase the pre-load on the spring 566 to achieve the calibrated low torque setting of the tool 300. Similarly, if the non-calibrated torque is greater than the calibrated low torque (i.e., 60 inch-pounds), then the engaging force between the balls 518 and the protrusions 462 on the outer ring gear 438 may be decreased by rotating the nut 574 on the nose portion 546 of the front transmission housing 350 in an opposite direction to decrease the pre-load on the spring 566 to achieve the calibrated low torque setting of the tool 300.

The tool 300 may also include structure to facilitate independent calibration of the high torque setting (i.e., 80 inch-pounds) from the calibration of the low torque setting (i.e., 60 inch-pounds). For example, the tool 300 may include a second cam ring (not shown) positioned coaxially with the cam ring 586 and the washer 542, and rotatable relative to the cam ring 586 and the washer 542. The second cam ring may also be axially constrained between the cam ring 586 and the washer 582. The second cam ring may include at least one cam surface similar to the cam surface 590 on the front of the cam ring 586, and the cam ring 586 may include a corresponding cam surface (not shown) on the rear of the cam 586 having a reverse-inclined slope as the cam surface on the second cam ring. The second cam ring may be rotated relative to the cam ring 586 to misalign the respective cam surfaces on the second cam ring and the rear of the cam ring 586, thereby not affecting the axial positioning of the cam ring 586 when the clutch mechanism 514 is configured in the low torque setting. However, the second cam ring may be rotated relative to the cam ring 586 to at least partially align the respective cam surfaces on the second cam ring and the rear of the cam ring 586, when the cam ring 586 is rotated to a position associated with the high torque setting of the tool 300. As a result, the axial position of the cam ring 586 with respect to the exterior face 550 of the front transmission housing 350 may be incrementally adjusted to incrementally increase or decrease the pre-load of the spring 566 to achieve the high torque setting of the tool 300.

If the non-calibrated high torque setting is less than the calibrated high torque setting (i.e., 80 inch-pounds), then the engaging force between the balls 518 and the protrusions 462 on the outer ring gear 438 may be increased by aligning the respective cam surfaces on the second cam ring and the rear of the cam ring 586 to increase the pre-load on the spring 566, when the cam ring 586 is rotated to a position associated with the high torque setting, to achieve the calibrated high torque setting of the tool 300. Likewise, if the non-calibrated high torque setting is greater than the calibrated high torque setting (i.e., 80 inch-pounds), then the engaging force between the balls 518 and the protrusions 462 on the outer ring gear 438 may be decreased by misaligning the respective cam surfaces on the second cam ring and the rear of the cam ring 586 to decrease the pre-load on the spring 566, when the cam ring 586 is rotated to a position associated with the high torque setting, to achieve the calibrated high torque setting of the tool 300.

With reference to FIGS. 21 and 22, the precision torque tool 300 further includes a shift mechanism 658 coupled for co-rotation with the mode selector ring 634 and the cam ring 586. As is explained in more detail below, the shift mechanism 658 is rotatable between a first position, in which each of the first, second, and third stage planetary transmissions 338, 342, 346 is enabled to provide a low-speed, high-torque output to the output shaft 314, and a second position, in which the second stage planetary transmission 342 is disabled to provide a high-speed, low-torque output to the output shaft 314.

In the illustrated construction of the tool 300, the shift mechanism 658 includes a sleeve 662 having a plurality of axially-extending fingers 666, and the mode selector ring 634 includes a plurality of corresponding slots 670 (FIG. 22) within which the fingers 666 are received to fix the sleeve 662 for co-rotation with the mode selector ring 634. As shown in FIG. 21, the front transmission housing 350 includes a plurality of arcuate slots 674, each defining a radius of curvature coaxial with the central axis 318, through which the respective fingers 666 extend to engage the mode selector ring 634. Alternatively, the sleeve 662 and the mode selector ring 634 may utilize any of a number of different structural arrangements to fix the sleeve 662 for co-rotation with the mode selector ring 634.

Figure 25:
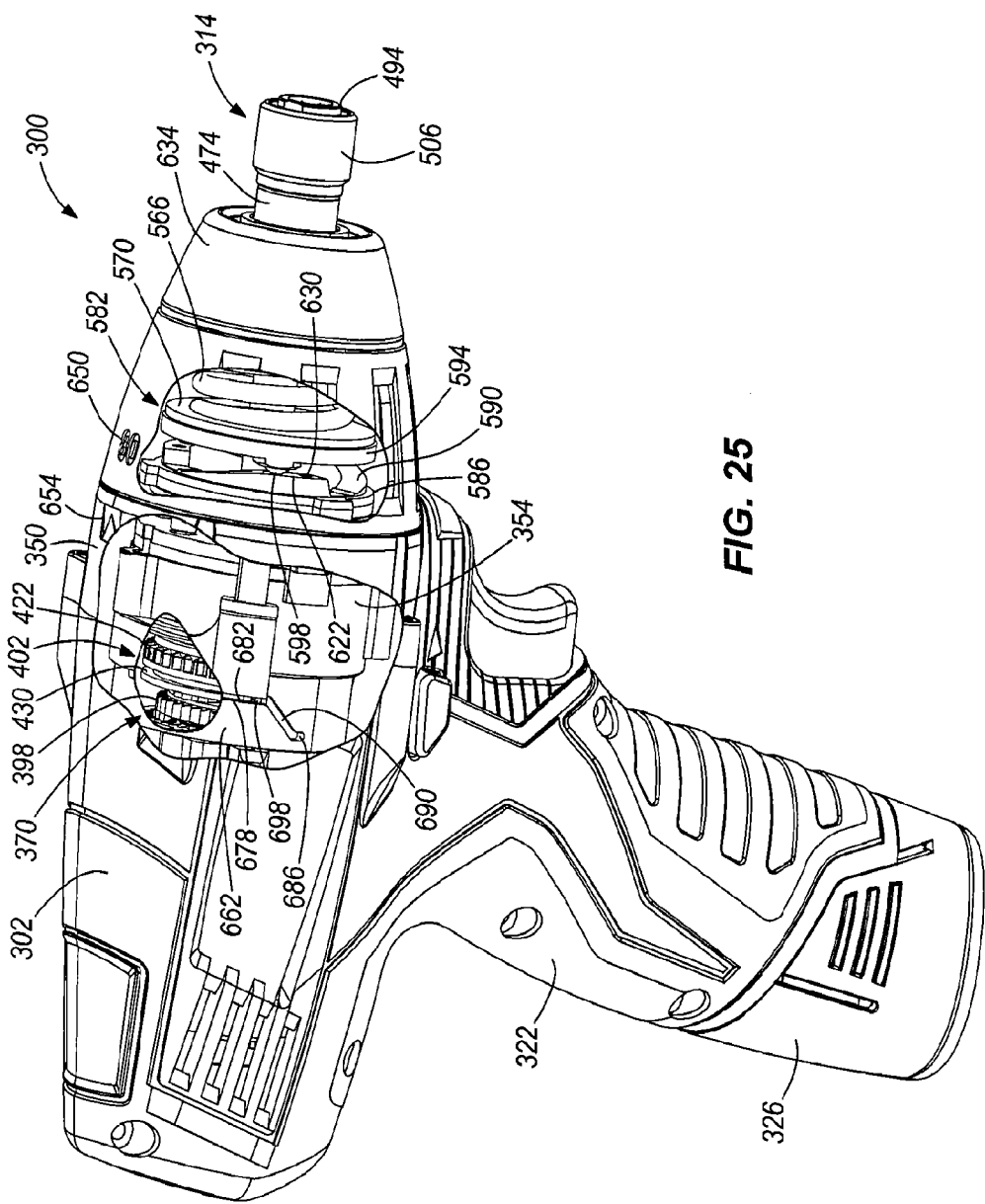
FIG. 25 a perspective, partial cutaway view of the precision torque tool of FIG. 20, illustrating the precision torque tool in a second torque setting.

With reference to FIGS. 21 and 22, the sleeve 662 includes a plurality of circumferential slots 678, at least a portion of each of which includes an axial component with respect to the central axis 318. In the illustrated construction of the tool 300, each of the circumferential slots 678 includes spaced, circumferential portions 682, 686 each having only a circumferential component of direction with respect to the central axis 318 (FIGS. 23 and 27), and a diagonal portion 690 having both a circumferential component and an axial component of direction with respect to the central axis 318 (FIG. 25). Alternatively, the circumferential portion 686 of each of the slots 678 may be omitted such that the end of the slot 678 coincides with the diagonal portion 690 of the slot 678.

With reference to FIGS. 21 and 22, the shift mechanism 658 also includes a wire 694 disposed within the circumferential groove 430 of the outer ring gear 402 of the second stage planetary transmission 342 and having opposite ends 698 received within respective axially-extending slots 702 in the rear transmission housing 354. As such, the slots 702 prevent the wire 694 from rotating relative to the rear transmission housing 354, but allow the wire to move axially within the rear transmission housing 354.

Figure 23:
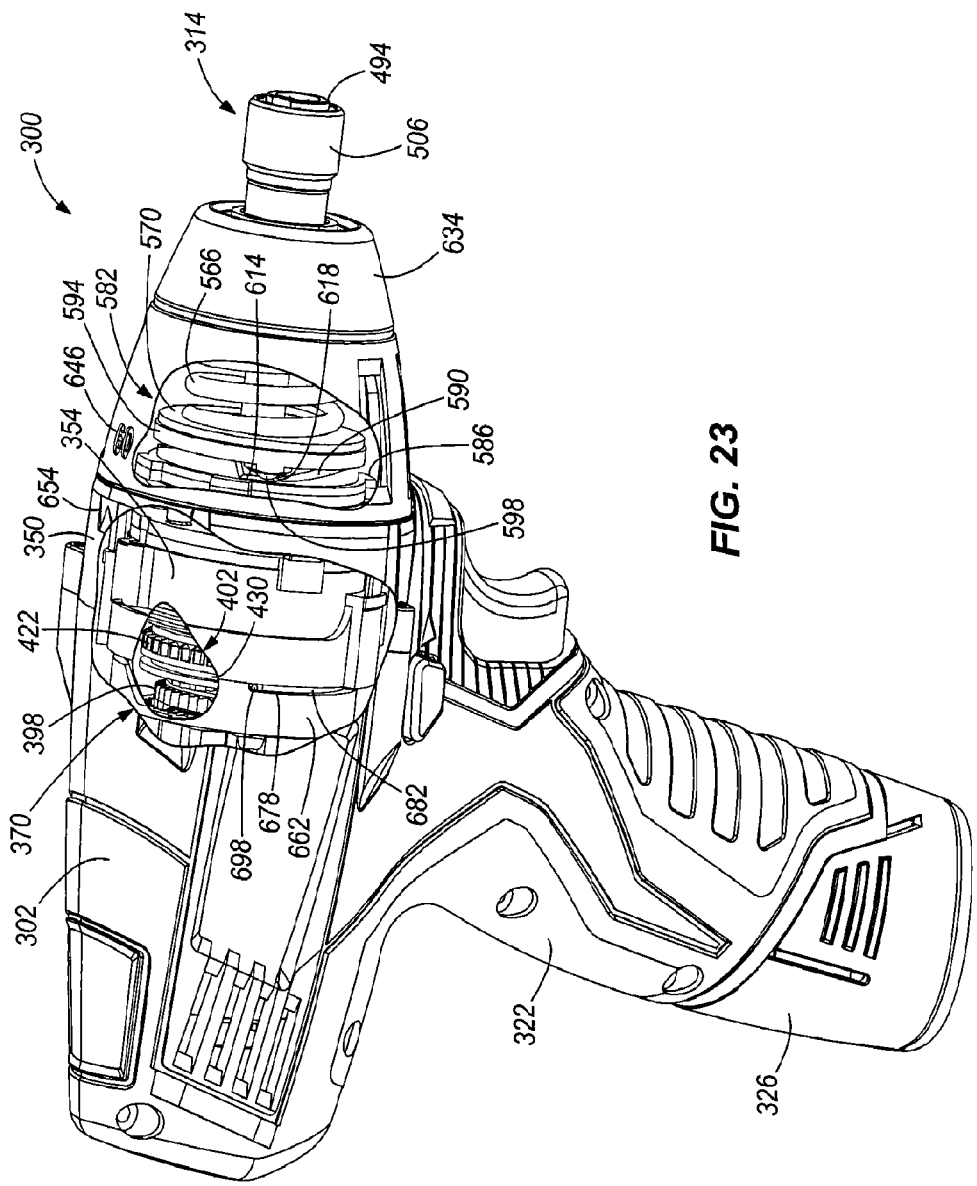
FIG. 23 a perspective, partial cutaway view of the precision torque tool of FIG. 20, illustrating the precision torque tool in a first torque setting.
Figure 27:
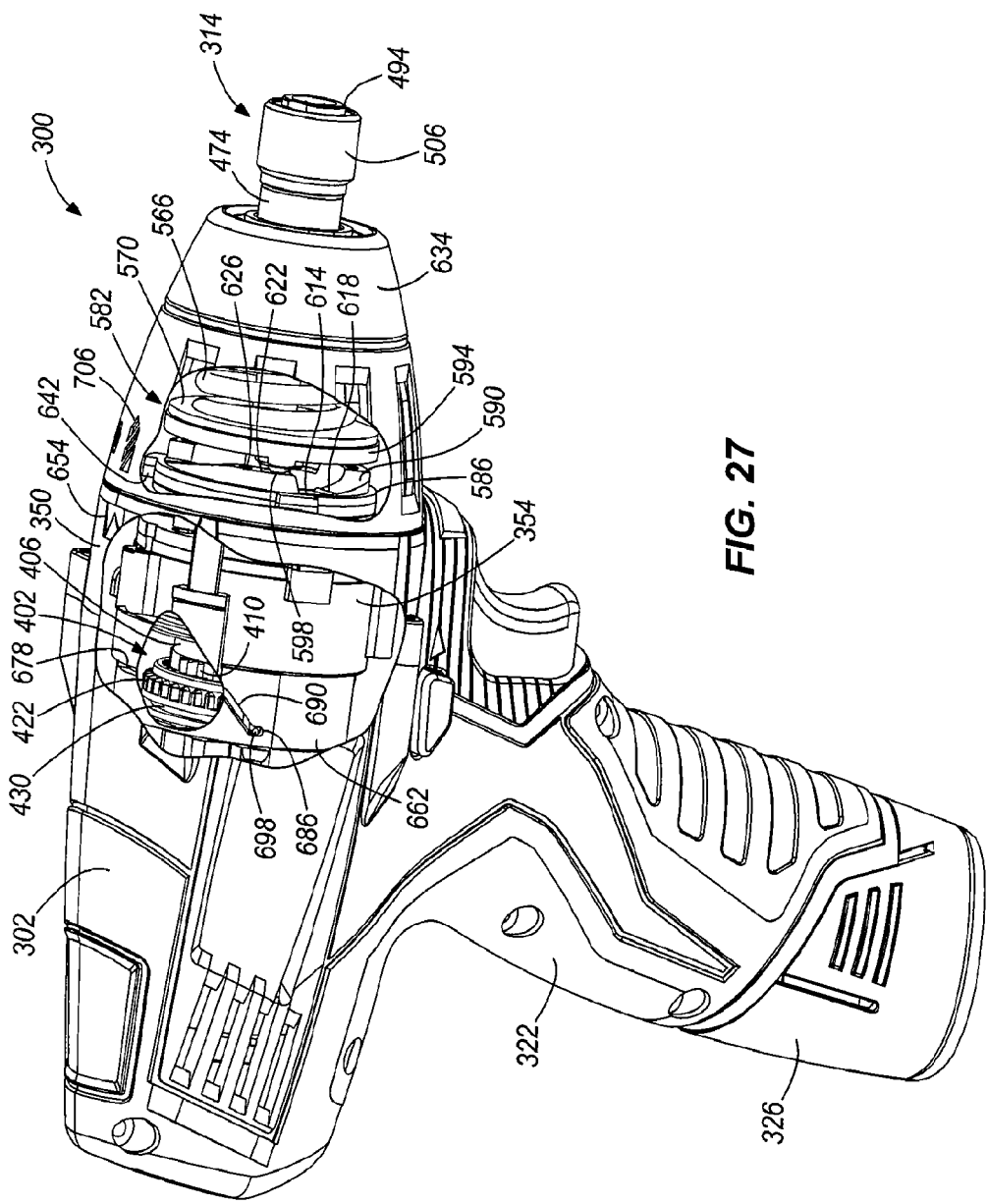
FIG. 27 is a side, partial cutaway view of the precision torque tool of FIG. 20, illustrating the precision torque tool in a drill setting.

The ends 698 of the wire 694 are also received in the respective circumferential slots 678 in the sleeve 662 (one end 698 of the wire 694 is shown received in one of the circumferential slots 678 in FIG. 23). As shown in FIGS. 23, 25, and 27, the ends 698 of the wire 694 travel within the respective circumferential slots 678 in response to rotation of the sleeve 662 about the central axis 318. When traveling within the diagonal portion 690 of each of the slots 678, the sleeve 662 imparts an axial motion to the wire 694 and the outer ring gear 402 of the second stage planetary transmission 342 along the central axis 318 toward the motor 306. As is described in more detail below, this axial motion causes the radially outwardly-extending teeth 422 on the outer ring gear 402 to disengage the radially inwardly-extending teeth 426 on the rear transmission housing 354, thereby decoupling the outer ring gear 402 and the rear transmission housing 354. This axial motion also causes the radially inwardly-extending teeth 414 on the outer ring gear 402 to engage the radially outwardly-extending teeth 398 on the carrier 370 of the first stage planetary transmission 338 to rotationally interlock the carrier 370 and the outer ring gear 402 to disable the second stage planetary transmission 342.

With reference to FIG. 20, the mode selector ring 634 includes an icon 706 indicative of the high-speed, low-torque mode of operation of the tool 300. In the illustrated construction of the tool 300, the icon 706 is configured as a drill bit suggestive of a drilling mode of operation utilizing the high-speed, low-torque output of the tool 300. Alternatively, the icon 706 may be configured in any of a number of different ways to correspond with any of a number of different applications of the tool 300 utilizing the high-speed, low-torque output. As shown in FIG. 27, when the drill bit icon 706 is aligned with the marking 654 on the front transmission housing 350, the ends 698 of the wire 694 are disposed within the circumferential portion 686 of the respective slots 678 and the spherical rollers 598 are received with the recesses 630 in the cam ring 586. Receipt of the spherical rollers 598 in the respective recesses 630 also provides a tactile indicator that the shift mechanism 658 has disabled the second stage planetary transmission 342 to utilize the high-speed, low-torque output of the tool 300.

Figure 30:
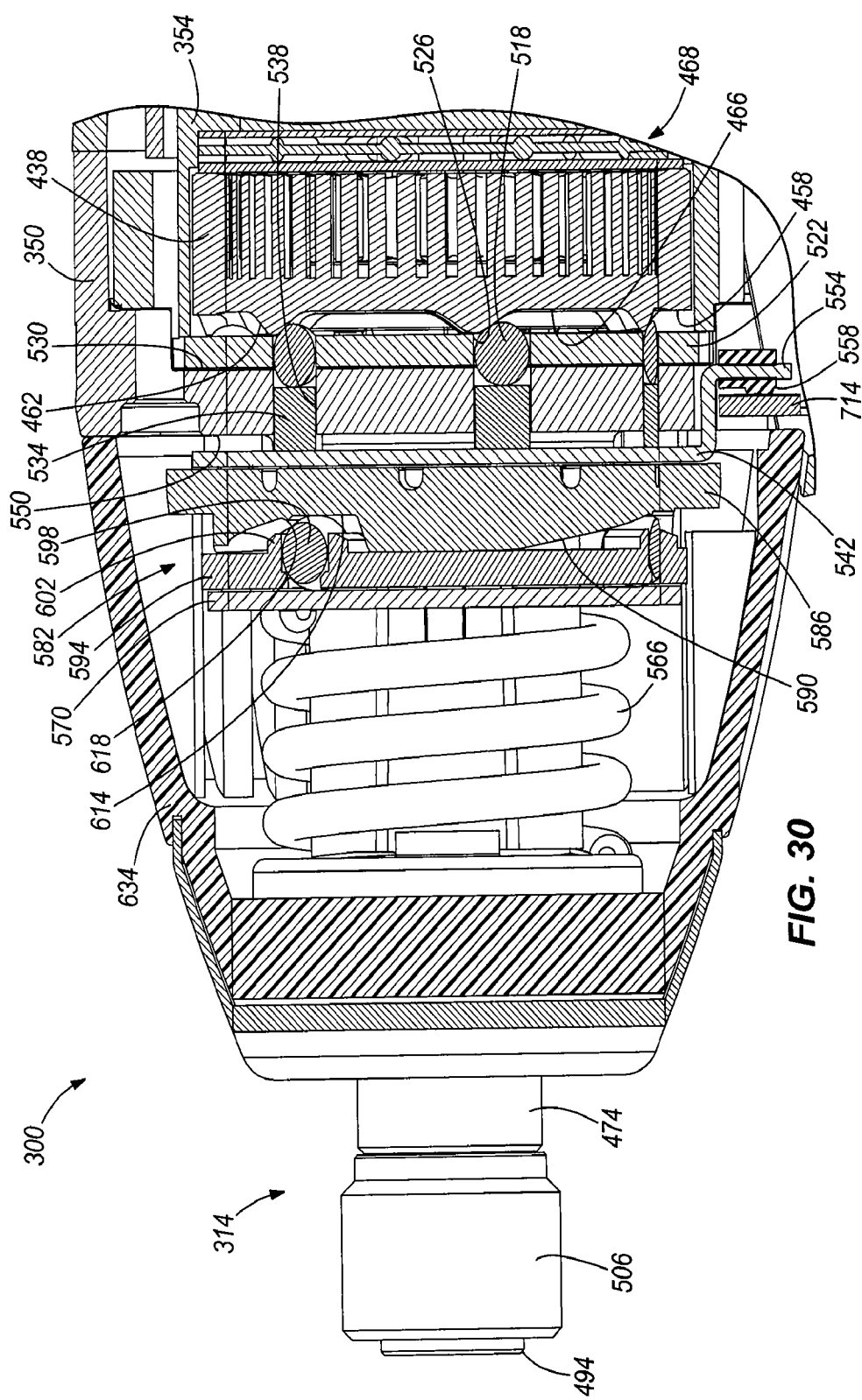
FIG. 30 is an enlarged, cross-sectional view of a portion of the precision torque tool of FIG. 20, illustrating the precision torque tool in the first torque setting and the clutch mechanism in an engaged configuration.
Figure 31:
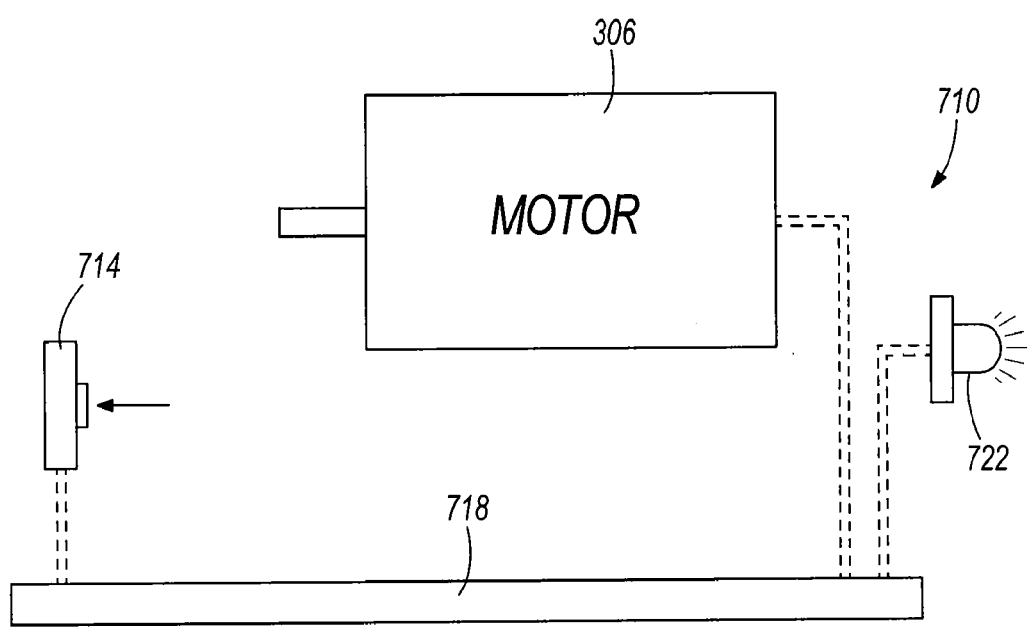
FIG. 31 is a schematic illustrating a motor, a switch, and an indicator electrically connected to an electrical circuit board of the precision torque tool of FIG. 20.

With reference to FIG. 31, the precision torque tool 300 also includes a motor shut-off switch assembly 710 having a switch 714 supported in the housing 302 (FIGS. 21 and 22) and an electrical circuit 718 (e.g., formed on a printed circuit board or PCB) coupled between the switch 714 and the motor 306. The switch 714 is configured as a contact-style 714 switch that is triggered by displacement of the washer 542 from the exterior face 550 of the front transmission housing 350 when the clutch mechanism 514 slips. Specifically, upon displacement of the washer 542 from the exterior face 550 of the front transmission housing 350, the elastomeric pad 558 contacts and triggers the switch 714 which, in turn, provides a signal to the electrical circuit 718 to deactivate the motor 306 (FIG. 30). Alternatively, the switch 714 may be configured as a non-contact switch.

With reference to FIG. 31, the motor shut-off switch assembly 710 also includes an indicator 722 electrically connected to the electrical circuit 718 and positioned relative to the tool housing 302 such that the indicator 722 is visible from outside of the tool housing 302 (see also FIGS. 21 and 22). In the illustrated construction of the tool 300, the indicator 722 is configured as an LED indicator 722. Alternatively, the indicator 722 may be configured as a different type of light-emitting indicator or, as a further alternative, the indicator 722 may be configured as an auditory indicator. As is explained in more detail below, the electrical circuit 718 activates the indicator 722 in response to the switch 714 being triggered by the clutch mechanism 514 as it slips thereby communicating to the user of the tool 300 that the desired torque setting has been achieved.

With reference to FIGS. 23 and 24, the precision torque tool 300 is shown in the low-speed, high-torque 60 inch-pound setting, as indicated by the alignment of the marking 654 on the front transmission housing 350 with the icon 646 designating the 60 inch-pound torque setting. As shown in FIG. 23, the spherical rollers 598 are engaged with the low-elevation, non-inclined surfaces 614 on the cam ring 586 to preload the spring 566 an amount sufficient to prevent the clutch mechanism 514 from slipping when the reaction torque on the output shaft 314 is less than 60 inch-pounds. Also, as shown in FIG. 23, the ends 698 of the wire 694 are disposed in the circumferential portion 682 of the respective slots 678, thereby maintaining the outer ring gear 402 of the second stage planetary transmission 342 engaged to the rear transmission housing 354 to prevent rotation of the outer ring gear 402 relative to the rear transmission housing 402. In this position, the outer ring gear 402 is also spaced from the carrier 370 such that the teeth 382, 414 of the carrier 370 and the outer ring gear 402, respectively, are not engaged.

Figure 29:
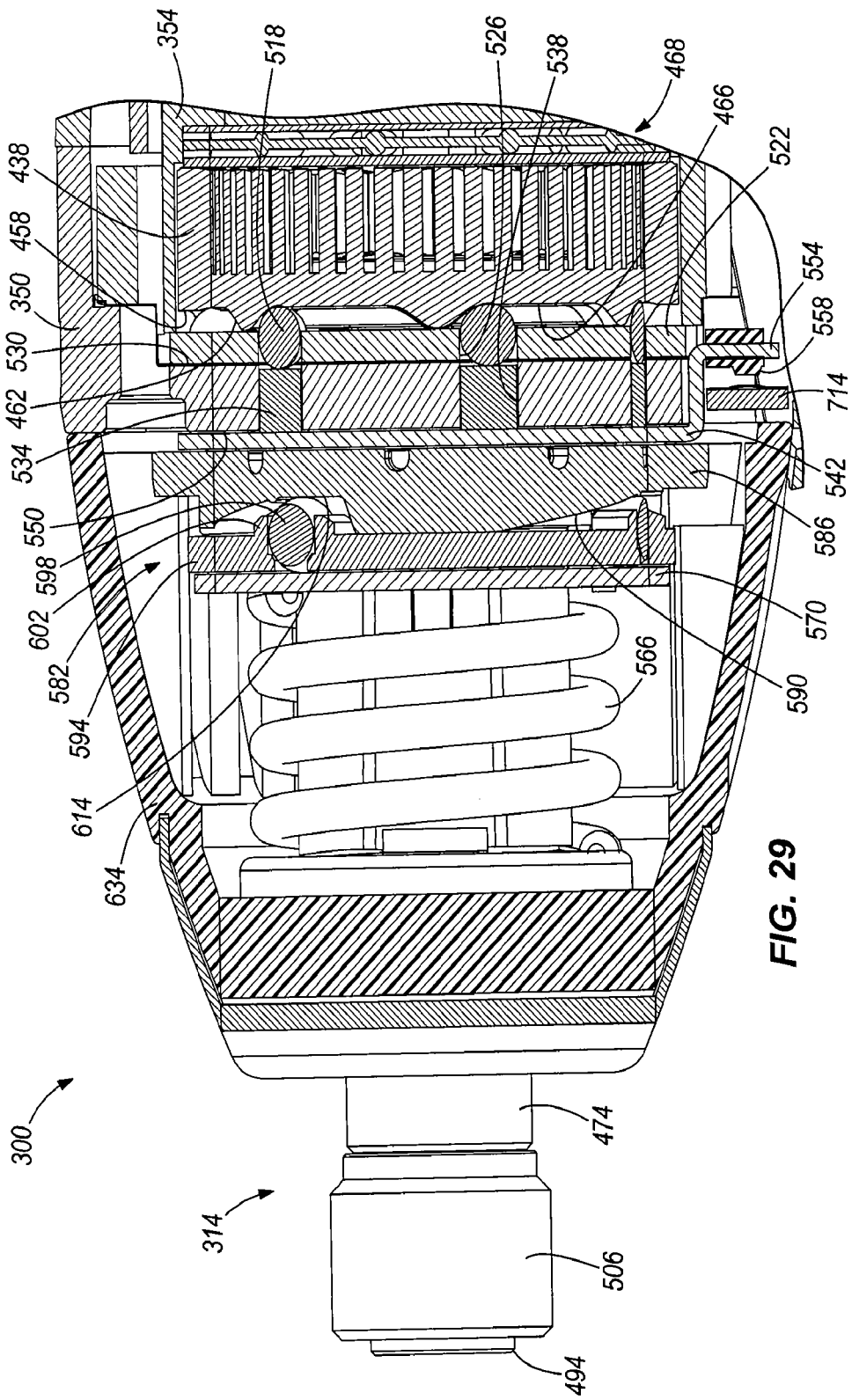
FIG. 29 is an enlarged, cross-sectional view of a portion of the precision torque tool of FIG. 20, illustrating the precision torque tool in the first torque setting and a clutch mechanism of the precision torque tool in a disengaged configuration.

In operation of the tool 300 when the reaction torque on the output shaft 314 is less than 60 inch-pounds, the torque from the motor 306 is transferred through the transmission 310 to the output shaft 314 to continue driving the fastener and/or tool bit received in the drive end 494 of the spindle 474. Specifically, when the reaction torque on the output shaft 314 is less than 60 inch-pounds, the spring 566 biases the washer 542, the cylindrical pins 534, and the balls 518 away from the drive end 494 of the spindle 474, causing the balls 518 to remain in the grooves 466 in the end face 458 of the outer ring gear 438 and jam against the protrusions 462 on the outer ring gear 438 (FIG. 29). As a result, the outer ring gear 438 is prevented from rotating relative to the transmission housings 350, 354, and the torque transferred from the second stage planetary transmission 342 to the third stage planetary transmission 346 is subsequently transferred through the third stage planetary transmission 346 to the output shaft 314.

However, when the reaction torque on the output shaft 314 reaches 60 inch-pounds, the torque from the motor 306 is diverted from the output shaft 314 toward the outer ring gear 438 of the third stage planetary transmission 346. Specifically, when the reaction torque on the output shaft 314 reaches 60 inch-pounds, the frictional force exerted on the outer ring gear 438 by the balls 518 jammed against the protrusions 462 on the outer ring gear 438 is no longer sufficient to counteract the torque exerted on the outer ring gear 438 by the rotation of the planet gears 446, the clutch mechanism 514 slips and ceases torque transfer to the output shaft 314. Rather, torque transferred from the second stage planetary transmission 342 causes the outer ring gear 438 of the third stage planetary transmission 346 to slip and rotate relative to transmission housings 350, 354 which, in turn, causes the balls 518 to slowly ride up the respective protrusions 462 on the outer ring gear 438. As the balls 518 ride up the respective protrusions 462, the balls 518, the cylindrical pins 534, the washer 542, and the clutch mechanism adjustment assembly 582 are axially displaced away from the motor 306 against the bias of the spring 566 (FIG. 30). The thrust washer assembly 468 reduces the variation in friction exerted on the outer ring gear 438 by the rear transmission housing 354, which facilitates slipping of the outer ring gear 438 precisely upon reaching the low torque and high torque settings.

Prior to the balls 518 reaching the apex of the respective protrusions 462, the washer 542 is displaced from the exterior face 550 of the front transmission housing 350 a sufficient amount to allow the elastomeric pad 558 on the arm 554 to contact the switch 714 which, in turn, signals the electrical circuit 718 to deactivate the motor 306 to prevent additional torque from being transferred to the outer ring gear 438 of the third stage planetary transmission 346. Nearly simultaneously with deactivation of the motor 306, the electrical circuit 718 signals the indicator 722 to illuminate, thereby communicating to the user of the tool 300 that the desired 60 inch-pound setting has been achieved. Alternatively, the protrusions 462 on the outer ring gear 438 may be sized such that the pad 558 contacts the switch 714 upon the balls 518 rolling over the apex of the respective protrusions 462.

Should the user of the precision torque tool 300 decide to adjust the tool 300 to a higher torque setting, the user would grasp the mode selector ring 634 and rotate the mode selector ring 634 toward the 80 inch-pound torque setting. Because the mode selector ring 634 and the cam ring 586 are coupled for co-rotation as described above, rotation of the mode selector ring 634 toward the 80 inch-pound setting also causes the cam ring 586 to rotate relative to the follower ring 594 which, in turn, causes the spherical rollers 598 to ride up the respective cam surfaces 590 on the cam ring 586. As the rollers 598 ride up the respective cam surfaces 590, the follower ring 594 is axially displaced from the cam ring 586 to increase the preload of the spring 566. During the transition from the 60 inch-pound setting to the 80 inch-pound setting, the user would receive tactile feedback through the mode selector ring 634 when the spherical rollers 598 pass over the respective ridges 618 on the cam ring 586, and when the spherical rollers 598 are received within the respective recesses 626 in the cam ring 586.

Figure 26:
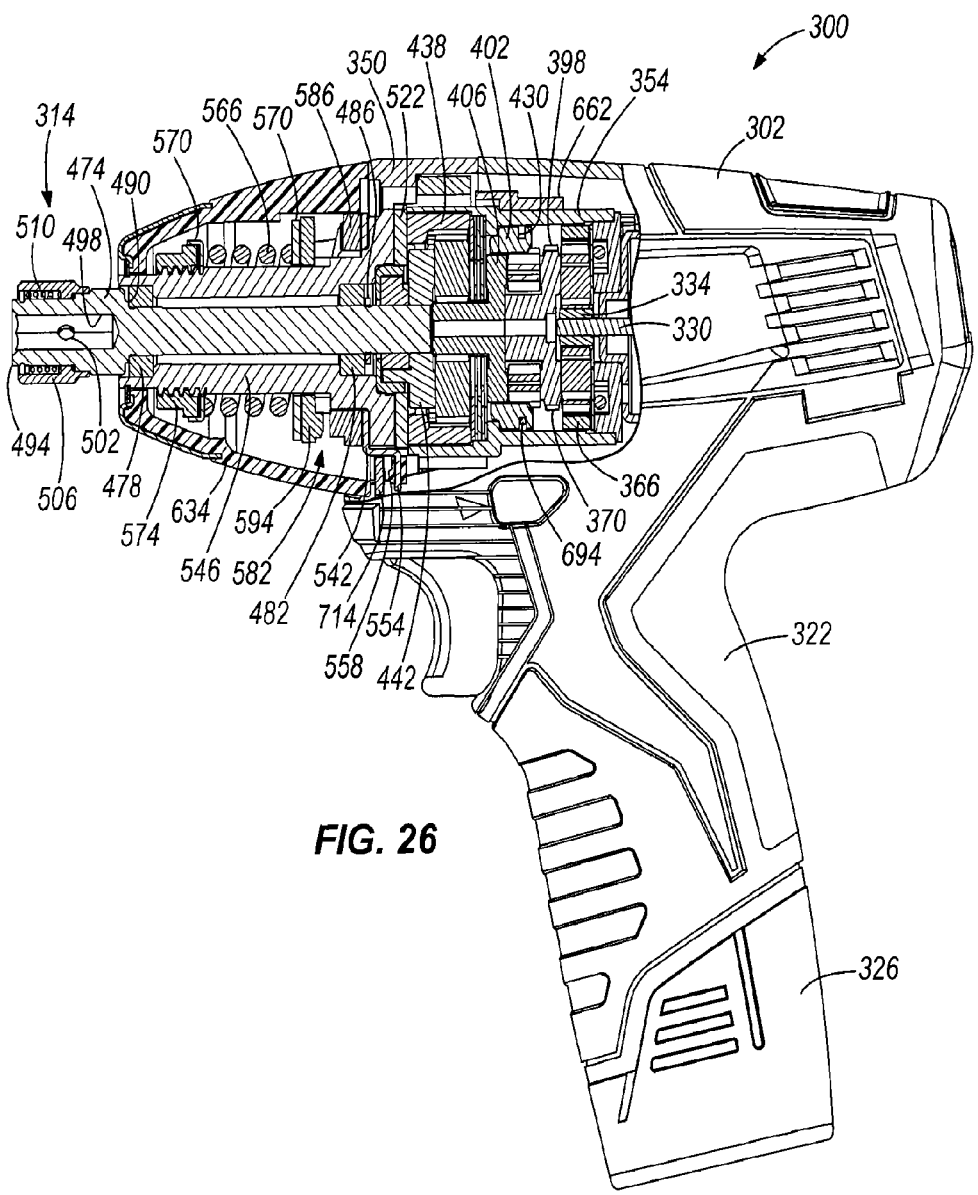
FIG. 26 is a side, partial cutaway view of the precision torque tool of FIG. 20, illustrating the precision torque tool in the second torque setting.

With reference to FIGS. 25 and 26, the precision torque tool 300 is shown in the low-speed, high-torque 80 inch-pound setting, as indicated by the alignment of the marking 654 on the front transmission housing 350 with the icon 650 designating the 80 inch-pound torque setting. As shown in FIG. 25, the spherical rollers 598 are positioned in the respective recesses 626 in the cam ring 586 to preload the spring 566 an amount sufficient to prevent the clutch mechanism 518 from slipping when the reaction torque on the output shaft 314 is less than 80 inch-pounds. Also, as shown in FIG. 25, the ends 698 of the wire 694 continue to be disposed in the circumferential portion 682 of the respective slots 678, thereby maintaining the outer ring gear 402 of the second stage planetary transmission 342 engaged to the rear transmission housing 354 to prevent rotation of the outer ring gear 402 relative to the rear transmission housing 354. Also, in this position, the outer ring gear 402 is spaced from the carrier 370 such that the teeth 382, 414 of the carrier 370 and the outer ring gear 402, respectively, are not engaged.

In operation of the tool 300 when the reaction torque on the output shaft 314 is less than 80 inch-pounds, the torque from the motor 306 is transferred through the transmission 310 to the output shaft 314 to continue driving the fastener and/or tool bit received in the drive end 494 of the spindle 474. Specifically, when the reaction torque on the output shaft 314 is less than 80 inch-pounds, the spring 566 biases the washer 542, the cylindrical pins 534, and the balls 518 away from the drive end 494 of the spindle 474, causing the balls 518 to remain in the grooves 466 in the end face 458 of the outer ring gear 438 and jam against the protrusions 462 on the outer ring gear 438 (FIG. 29). As a result, the outer ring gear 438 is prevented from rotating relative to the transmission housings 350, 354, and the torque transferred from the second stage planetary transmission 342 to the third stage planetary transmission 346 is subsequently transferred through the third stage planetary transmission 346 to the output shaft 314.

However, when the reaction torque on the output shaft 314 reaches 80 inch-pounds, the torque from the motor 306 is diverted from the output shaft 314 toward the outer ring gear 438 of the third stage planetary transmission 346. Specifically, when the reaction torque on the output shaft 314 reaches 80 inch-pounds, the frictional force exerted on the outer ring gear 438 by the balls 518 jammed against the protrusions 462 on the outer ring gear 438 is no longer sufficient to counteract the torque exerted on the outer ring gear 438 by the rotation of the planet gear 446, the clutch mechanism 514 slips and ceases torque transfer to the output shaft 314. Rather, torque transferred from the second stage planetary transmission 342 causes the outer ring gear 438 of the third stage planetary transmission to slip 346 and rotate relative to transmission housings 350, 354 which, in turn, causes the balls 518 to slowly ride up the respective protrusions 462 on the outer ring gear 438. As the balls 518 ride up the respective protrusions 462, the balls 518, the cylindrical pins 534, the washer 542, and the clutch mechanism adjustment assembly 582 are axially displaced away from the motor 306 against the bias of the spring 566 (FIG. 30).

Prior to the balls 518 reaching the apex of the respective protrusions 462, the washer 542 is displaced from the exterior face 550 of the front transmission housing 350 a sufficient amount to allow the elastomeric pad 558 on the arm 554 to contact the switch 714 which, in turn, signals the electrical circuit 718 to deactivate the motor 306 to prevent additional torque from being transferred to the outer ring gear 438 of the third stage planetary transmission 346. Nearly simultaneously with deactivation of the motor 306, the electrical circuit 718 signals the indicator 722 to illuminate, thereby communicating to the user of the tool 300 that the desired 80 inch-pound setting has been achieved.

Should the user of the precision torque tool 300 decide to adjust the tool 300 to the high-speed, low-torque or "drill mode" setting, the user would grasp the mode selector ring 634 and rotate the mode selector ring 634 from the 80 inch-pound torque setting toward the drill mode setting as indicated by the drill bit icon 706. Because the mode selector ring 634 and the cam ring 586 are coupled for co-rotation as described above, rotation of the mode selector ring 634 toward the drill mode setting also causes the cam ring 586 to rotate relative to the follower ring 594 which, in turn, causes the spherical rollers 598 to move from the recesses 626 to the recesses 630. Because the surface 622 in which the recesses 626, 630 are disposed is not inclined relative to the central axis 318, the follower ring 594 is not further axially displaced from the cam ring 586 when the mode selector ring 634 is rotated to the drill mode setting. As such, the preload of the spring 566 is unchanged when adjusting the tool 300 from the 80 inch-pound torque setting to the drill mode setting. During the transition from the 80 inch-pound setting to the drill mode setting, the user would receive tactile feedback through the mode selector ring 634 when the spherical rollers 598 are received within the respective recesses 630 in the cam ring 586.

Figure 28:
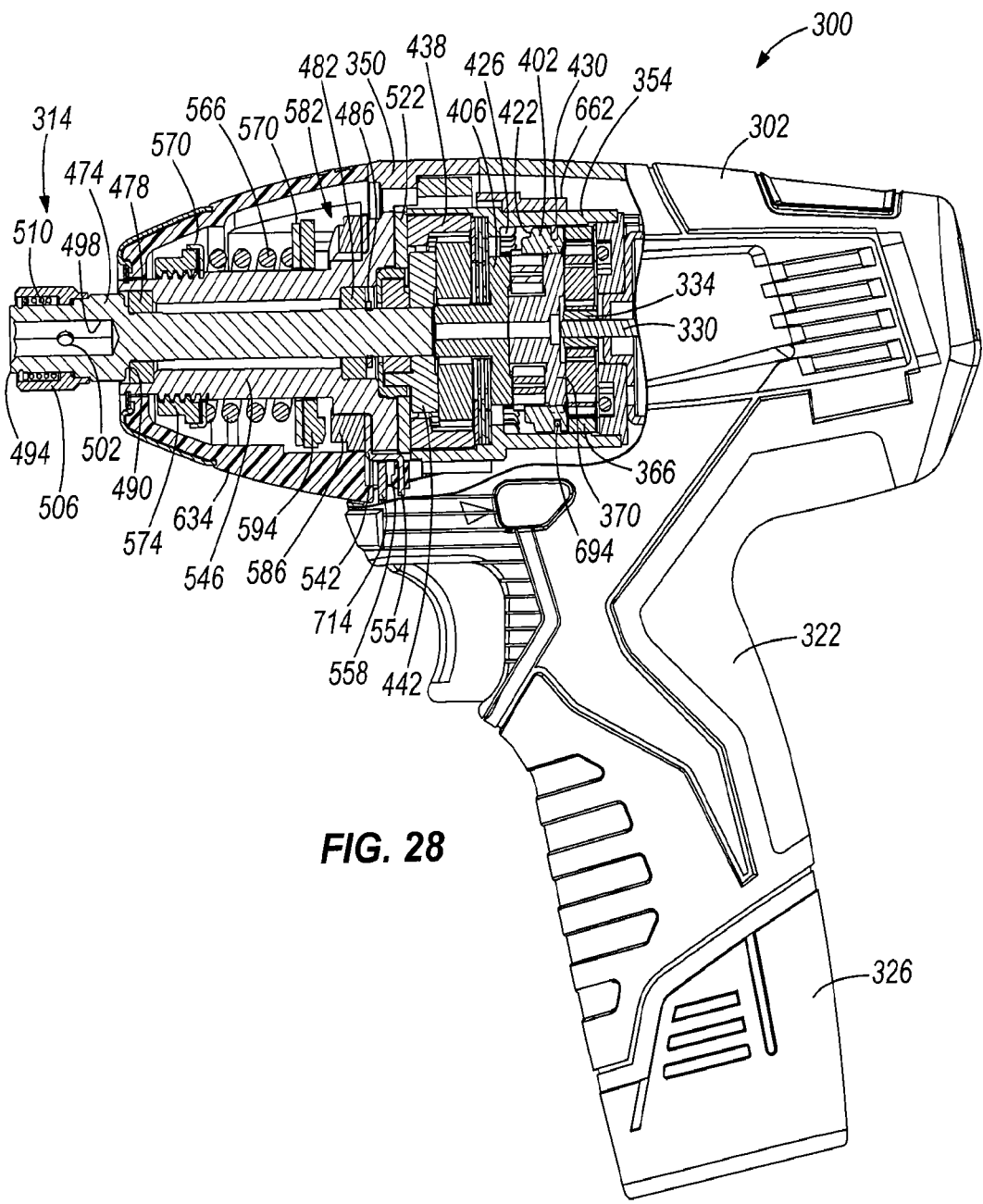
FIG. 28 is a side, partial cutaway view of the precision torque tool of FIG. 20, illustrating the precision torque tool in the drill setting.

With reference to FIGS. 27 and 28, the precision torque tool 300 is shown in the high-speed, low-torque drill mode setting, as indicated by the alignment of the marking 654 on the front transmission housing 350 with the drill bit icon 706. As shown in FIG. 27, the ends 698 of the wire 694 are disposed in the circumferential portion 686 of the respective slots 678 as a result of having traveled through the diagonal portion 690 of the respective slots 678 in response to the mode selector ring 634 and the sleeve 662 rotating about the central axis 318 from the 80 inch-pound setting to the drill mode setting. While the ends 698 of the wire 694 travel within the diagonal portion 690 of the respective slots 678, the wire 694 and the outer ring gear 402 of the second stage planetary transmission 342 are displaced along the central axis 318 toward the motor 306, thereby disengaging the outer ring gear 402 from the rear transmission housing 354, and engaging the outer ring gear 402 and the carrier 370 of the first stage planetary transmission 338 to disable the second stage planetary transmission 342 by allowing the outer ring gear 402 and the carriers 370, 406 of the first and second stage planetary transmissions 330, 342 to co-rotate relative to the transmission housings 350, 354. By disabling the second stage planetary transmission 342, speed reduction through the second stage planetary transmission 342 does not occur. Therefore, the rotational speed of the carrier 370 of the first stage planetary transmission 338 is transferred directly to the carrier 406 of the second stage planetary transmission 342 for input to the third stage planetary transmission 346.

The clutch mechanism 514 is not disabled when the tool 300 is in the drill mode setting. However, by disabling the second stage planetary transmission 342 when in the drill mode setting, the available torque at the output shaft 314 is not expected to reach or exceed 80 inch-pounds. As a result, the clutch mechanism 514 would not operate as described above to divert torque away from the output shaft 314 and toward the outer ring gear 438 of the third stage planetary transmission 346. Rather, the output shaft 314 would likely seize prior to the clutch mechanism 514 slipping.

Various features of the invention are set forth in the following claims.

What is claimed is:

1. A power tool comprising:
   a housing;
   a motor supported in the housing;
   a transmission operably coupled to the motor to receive torque from the motor;
   an output shaft rotatable about a central axis and operably coupled to the transmission to receive torque from the transmission;
   a clutch mechanism coupled to the transmission and operable in a first mode, in which torque from the motor is transferred to the output shaft through the transmission, and a second mode, in which torque from the motor is diverted from the output shaft toward a portion of the transmission;
   a clutch mechanism adjustment assembly including
      a first ring rotatable about the central axis and having a cam surface spaced from the central axis in a radial direction;
      a second ring coaxial with the first cam ring and in facing relationship with the cam surface of the first ring; and
      a cam member disposed between the cam surface and the second ring;
   wherein the clutch mechanism includes a resilient member for at least partially imparting reciprocating motion to the clutch mechanism adjustment assembly along the central axis during operation of the clutch mechanism in the second mode, and wherein, in response to rotation of the first ring relative to the second ring, the cam member engages the cam surface to displace the second ring relative to the first ring along the central axis and compress the resilient member to increase the amount of torque transferred to the output shaft during the first mode of operation of the clutch mechanism.

2. The power tool of claim 1, wherein the first ring is rotatable relative to the second ring between a first position, in which the resilient member is compressed a first amount, and a second position, in which the resilient member is compressed a second amount greater than the first amount.

3. The power tool of claim 2, wherein the first ring includes at least one recess in which the cam member is received when the first ring is rotated to at least one of the first position and the second position.

4. The power tool of claim 2, wherein the first ring includes
   a first recess in which the cam member is received when the first ring is rotated to the first position, and
   a second recess in which the cam member is received when the first ring is rotated to the second position.

5. The power tool of claim 1, wherein the cam member includes a ball coupled to the second ring.

6. The power tool of claim 1, wherein the cam surface is inclined relative to the central axis.

7. The power tool of claim 1, wherein the transmission includes at least one planetary transmission stage having an outer ring gear, wherein the outer ring gear includes an end face having at least one protrusion extending in a direction parallel to the central axis, and wherein the clutch mechanism includes at least one clutch member biased against the end face by the resilient member.

8. The power tool of claim 7, wherein in the first mode of operation of the clutch mechanism, the clutch member is jammed against the protrusion to substantially prevent rotation of the outer ring gear about the central axis relative to the housing, and wherein in the second mode of operation of the clutch mechanism, the protrusion displaces the clutch member in a direction parallel to the central axis in response to rotation of the outer ring gear about the central axis relative to the housing.

9. The power tool of claim 8, wherein the clutch mechanism adjustment assembly is disposed between the resilient member and the clutch member.

10. The power tool of claim 1, wherein the transmission includes a first stage transmission and a second stage transmission, and wherein the power tool further includes a shift mechanism coupled for co-rotation with the first ring and rotatable between a first position, in which the first and second stage transmissions are both enabled, and a second position, in which the second stage transmission is disabled.

11. The power tool of claim 10, wherein the first stage transmission is a first stage planetary transmission having a carrier, wherein the second stage transmission is a second stage planetary transmission having an outer ring gear, and wherein the outer ring gear is coupled for co-rotation with the carrier when the shift mechanism is in the second position.

12. The power tool of claim 11, wherein the transmission includes a transmission housing having a plurality of radially inwardly-extending teeth disposed about the central axis, wherein the outer ring gear includes a plurality of radially outwardly-extending teeth disposed about the central axis, and wherein the radially outwardly-extending teeth of the outer ring gear are engaged with the radially inwardly-extending teeth of the transmission housing when the shift mechanism is in the first position.

13. The power tool of claim 11, wherein the shift mechanism includes
a sleeve coupled for co-rotation with the first ring, the sleeve including a circumferential slot, at least a portion of the circumferential slot includes an axial component, and
a wire having first and second ends,
wherein at least a portion of the wire between the first and second ends is received in a circumferential groove in the outer ring gear, and wherein the first end of the wire is disposed in the circumferential slot.

14. The power tool of claim 13, wherein the sleeve is rotatable relative to the wire about the central axis between the first and second positions, wherein the first end is disposed in a portion of the circumferential slot without the axial component when the sleeve is rotated to the first position, and wherein the first end travels within the portion of the circumferential slot having the axial component when the sleeve is rotated from the first position to the second position.

15. The power tool of claim 14, wherein, in response to rotation of the sleeve from the first position to the second position, the wire and the outer ring gear are displaced along the central axis to engage the outer ring gear and the carrier to disable the second stage planetary transmission.

16. The power tool of claim 13, further comprising a mode selector ring coupled to the housing for rotation about the central axis, wherein the sleeve and the first ring are each coupled to the mode selector ring for co-rotation with the mode selector ring.

17. The power tool of claim 1, wherein the motor is an electric motor, and wherein the power tool further includes a motor shut-off switch assembly having
a switch supported in the housing, and
an electrical circuit coupled between the switch and the motor and operable to deactivate the motor in response to the switch being triggered.

18. The power tool of claim 17, wherein the switch is a contact switch, and wherein the switch is triggered by a portion of the clutch mechanism in response to the clutch mechanism switching from the first mode to the second mode.

19. The power tool of claim 17, wherein the motor shut-off switch assembly includes an indicator operably coupled to the electrical circuit, and wherein the electrical circuit activates the indicator in response to the clutch mechanism switching from the first mode to the second mode.

20. The power tool of claim 19, wherein the indicator is an LED indicator visible from outside of the housing.

* * * * *